US010688874B2

(12) United States Patent
Kwasnick et al.

(10) Patent No.: US 10,688,874 B2
(45) Date of Patent: Jun. 23, 2020

(54) VEHICULAR INDUCTIVE POWER TRANSFER SYSTEMS AND METHODS

(71) Applicant: Intel Corporation, Santa Clara, CA (US)

(72) Inventors: Robert F. Kwasnick, Palo Alto, CA (US); Suraj Sindia, Hillsboro, OR (US); Songnan Yang, San Jose, CA (US); Zhen Yao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 833 days.

(21) Appl. No.: 15/182,441

(22) Filed: Jun. 14, 2016

(65) Prior Publication Data

US 2017/0355275 A1 Dec. 14, 2017

(51) Int. Cl.
*H02J 7/02* (2016.01)
*B60L 11/18* (2006.01)
(Continued)

(52) U.S. Cl.
CPC ......... *B60L 11/1829* (2013.01); *B60L 53/124* (2019.02); *B60L 53/38* (2019.02);
(Continued)

(58) Field of Classification Search
CPC .... B60L 11/1829; B60L 53/124; B60L 53/38; H02J 7/025; H02J 50/10; H02J 50/90; Y02T 90/122
(Continued)

(56) References Cited

U.S. PATENT DOCUMENTS 5,461,298 A * 10/1995 Lara ................. B60L 3/0046
320/109
5,573,090 A * 11/1996 Ross ................. B60L 5/005
191/10
(Continued)

FOREIGN PATENT DOCUMENTS

JP 2015-198562 A 11/2015
KR 10-2013-0068921 A 6/2013
KR 10-2015-0019227 A 2/2015

OTHER PUBLICATIONS

"Wireless power could revolutionize highway transportation, Stanford researchers say," Mark Shwartz, Stanford Report, Published Online Feb. 1, 2012, Accessed Online Jul. 29, 2019, https://news.stanford.edu/news/2012/february/wireless-vehicle-charge-020112.html.*

(Continued)

*Primary Examiner* — John T Trischler
(74) *Attorney, Agent, or Firm* — Grossman, Tucker, Perreault & Pfleger, PLLC

(57) ABSTRACT

A vehicular inductive power transfer system includes a power transmission unit and a power receiving unit. The distance between the units and the overall alignment of the units with respect to each other determines the overall efficiency of the energy transfer between the power transmission unit and the power receiving unit. Magnetic fields produced by the inductive power transfer system may exceed allowable standards or regulations for human exposure to electromagnetic fields. An inductive power transfer control circuit autonomously causes an actuator to position at least one of the power transmission unit or the power receiving unit in a three-dimensional space based on one or more measured power transfer parameters. Such positioning may occur while the vehicle is moving or stationary. The control circuit may further autonomously adjust one or more (Continued)

power transfer parameters to maintain magnetic field exposure levels at or below industry standards or governmental regulations.

14 Claims, 19 Drawing Sheets

(51) Int. Cl.
- *B60L 53/124* (2019.01)
- *B60L 53/38* (2019.01)
- *H02J 50/90* (2016.01)
- *H02J 50/10* (2016.01)
- *H02J 50/60* (2016.01)

(52) U.S. Cl.
CPC .............. *H02J 7/025* (2013.01); *H02J 50/10* (2016.02); *H02J 50/90* (2016.02); *H02J 50/60* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC .......................................... 320/108; 307/104
See application file for complete search history.

(56) References Cited

U.S. PATENT DOCUMENTS

| | | | | |
|---|---|---|---|---|
| 5,669,470 | A * | 9/1997 | Ross | B60L 5/005 191/10 |
| 6,421,600 | B1 * | 7/2002 | Ross | B60L 5/005 701/117 |
| 6,879,889 | B2 * | 4/2005 | Ross | B60L 5/005 701/22 |
| 8,164,300 | B2 * | 4/2012 | Agassi | B60K 1/04 320/104 |
| 8,610,399 | B2 * | 12/2013 | Takada | H02J 5/005 320/108 |
| 8,712,481 | B2 * | 4/2014 | Shionoiri | B60L 8/003 455/572 |
| 8,731,781 | B2 * | 5/2014 | Prentice | B62D 35/02 701/49 |
| 8,884,581 | B2 * | 11/2014 | Widmer | B60L 11/182 320/108 |
| 9,026,269 | B2 * | 5/2015 | Cross | B60L 15/40 701/2 |
| 9,050,900 | B2 * | 6/2015 | Kai | H01M 10/44 |
| 9,071,284 | B2 * | 6/2015 | Wheeland | H02J 17/00 |
| 9,073,443 | B2 * | 7/2015 | Baier | B60L 11/1829 |
| 9,166,562 | B2 * | 10/2015 | Low | H04B 5/0037 |
| 9,252,846 | B2 * | 2/2016 | Lee | H04B 5/0031 |
| 9,356,659 | B2 * | 5/2016 | Partovi | H02J 7/025 |
| 9,478,991 | B2 * | 10/2016 | Weissentern | H02J 5/005 |
| 9,496,732 | B2 * | 11/2016 | Partovi | H02J 7/0042 |
| 9,525,288 | B2 * | 12/2016 | McKernan | H02J 5/005 |
| 9,608,480 | B2 * | 3/2017 | Lee | H04B 5/0031 |
| 9,637,014 | B2 * | 5/2017 | Schneider | H02J 7/025 |
| 9,656,564 | B2 * | 5/2017 | Widmer | B60L 11/182 |
| 9,676,285 | B2 * | 6/2017 | Niederhauser | B60L 11/182 |
| 9,694,685 | B2 * | 7/2017 | Ricci | B60L 3/0015 |
| 9,722,448 | B2 * | 8/2017 | Radovic | H04B 5/0037 |
| 9,772,401 | B2 * | 9/2017 | Widmer | G01S 13/04 |
| 9,780,572 | B2 * | 10/2017 | Standke | H01F 38/14 |
| 9,843,226 | B2 * | 12/2017 | Lee | H02J 17/00 |
| 9,889,754 | B2 * | 2/2018 | Percebon | B60L 11/182 |
| 9,929,569 | B2 * | 3/2018 | Tillotson | H01F 38/14 |
| 9,931,954 | B2 * | 4/2018 | Sankaran | B60L 53/38 |
| 9,941,708 | B2 * | 4/2018 | Keeling | H02J 5/005 |
| 9,944,192 | B2 * | 4/2018 | Ricci | B60L 11/1825 |
| 9,973,031 | B2 * | 5/2018 | Nejatali | H02J 7/025 |
| 9,979,236 | B2 * | 5/2018 | Lee | H02J 17/00 |
| 9,985,476 | B2 * | 5/2018 | Nomura | H02J 50/05 |
| 9,994,113 | B2 * | 6/2018 | Kristof | B60L 11/182 |
| 10,005,368 | B2 * | 6/2018 | Caldwell | B60L 11/1829 |
| 10,023,059 | B2 * | 7/2018 | Roehrl | B60L 11/1829 |
| 10,044,235 | B2 * | 8/2018 | Takatsu | E04H 6/24 |
| 10,056,791 | B2 * | 8/2018 | Wirz | H02J 7/025 |
| 10,071,641 | B2 * | 9/2018 | Ricci | B60L 11/182 |
| 10,090,885 | B2 * | 10/2018 | Widmer | B60L 53/65 |
| 10,093,195 | B2 * | 10/2018 | Ricci | B60L 11/182 |
| 10,122,214 | B2 * | 11/2018 | Low | H04B 5/0037 |
| 10,128,789 | B2 * | 11/2018 | Tillotson | H04B 5/0025 |
| 10,139,238 | B2 * | 11/2018 | Widmer | G01C 21/36 |
| 10,220,717 | B2 * | 3/2019 | Ricci | B64C 39/024 |
| 10,320,201 | B2 * | 6/2019 | Tillotson | H01F 38/14 |
| 10,336,194 | B2 * | 7/2019 | Ricci | B60L 3/0015 |
| 10,486,538 | B2 * | 11/2019 | Lewis | B60L 53/60 |
| 2003/0200025 | A1 * | 10/2003 | Ross | B60L 5/005 701/22 |
| 2005/0178632 | A1 * | 8/2005 | Ross | B60L 5/005 191/10 |
| 2006/0273756 | A1 * | 12/2006 | Bowling | H02J 7/0004 320/107 |
| 2008/0211320 | A1 * | 9/2008 | Cook | H01Q 7/005 307/149 |
| 2011/0221387 | A1 * | 9/2011 | Steigerwald | B60L 11/182 320/108 |
| 2011/0285349 | A1 * | 11/2011 | Widmer | B60L 11/182 320/108 |
| 2012/0025761 | A1 * | 2/2012 | Takada | H02J 5/005 320/108 |
| 2012/0242284 | A1 * | 9/2012 | Wheatley, III | H02J 17/00 320/108 |
| 2012/0262002 | A1 * | 10/2012 | Widmer | B60L 53/65 307/104 |
| 2013/0038136 | A1 * | 2/2013 | Wheatley | G06K 7/0008 307/104 |
| 2013/0049484 | A1 * | 2/2013 | Weissentern | H02J 5/005 307/104 |
| 2013/0062959 | A1 * | 3/2013 | Lee | H04B 5/0031 307/104 |
| 2013/0088194 | A1 * | 4/2013 | Hunter | H02J 7/025 320/108 |
| 2013/0099807 | A1 * | 4/2013 | Wheeland | H02J 17/00 324/713 |
| 2013/0221911 | A1 * | 8/2013 | Low | H02J 5/005 320/108 |
| 2013/0285604 | A1 * | 10/2013 | Partovi | H02J 7/0042 320/108 |
| 2013/0300204 | A1 * | 11/2013 | Partovi | H01F 38/14 307/104 |
| 2013/0304298 | A1 * | 11/2013 | Baier | B60L 11/1829 701/22 |
| 2014/0015329 | A1 * | 1/2014 | Widmer | G01D 5/2006 307/104 |
| 2014/0015493 | A1 * | 1/2014 | Wirz | H02J 7/025 320/137 |
| 2014/0054961 | A1 * | 2/2014 | Metcalf | H02J 17/00 307/19 |
| 2014/0103869 | A1 * | 4/2014 | Radovic | H04B 5/0037 320/108 |
| 2014/0207310 | A1 * | 7/2014 | Cross | B60L 15/40 701/2 |
| 2014/0217966 | A1 * | 8/2014 | Schneider | H02J 7/025 320/108 |
| 2014/0240057 | A1 * | 8/2014 | Low | H04B 5/0037 333/32 |
| 2014/0327391 | A1 | 11/2014 | Niederhauser et al. | |
| 2014/0333144 | A1 * | 11/2014 | Ikeuchi | H01F 38/14 307/104 |
| 2014/0354064 | A1 * | 12/2014 | Tseliakhovich | H02J 17/00 307/104 |
| 2015/0061590 | A1 | 3/2015 | Widmer et al. | |
| 2015/0145472 | A1 * | 5/2015 | Kees | B60L 11/1829 320/108 |
| 2015/0162785 | A1 * | 6/2015 | Lee | H02J 17/00 307/104 |

(56) References Cited

U.S. PATENT DOCUMENTS

| | | | | |
|---|---|---|---|---|
| 2015/0217655 A1* | 8/2015 | Sankaran | ................ | H02J 50/90 701/22 |
| 2016/0001669 A1* | 1/2016 | Ichikawa | ................ | H02J 5/005 307/10.1 |
| 2016/0039294 A1* | 2/2016 | Steigerwald | ......... | B60L 11/182 320/108 |
| 2016/0043574 A1* | 2/2016 | Low | .................... | H04B 5/0037 307/104 |
| 2016/0118806 A1* | 4/2016 | Standke | ................. | H01F 38/14 307/104 |
| 2016/0126746 A1* | 5/2016 | Keeling | ................. | H02J 5/005 307/104 |
| 2016/0129794 A1* | 5/2016 | Huang | ................. | B60L 11/182 320/108 |
| 2016/0226314 A1* | 8/2016 | Lee | ...................... | H04B 5/0031 |
| 2016/0254677 A1* | 9/2016 | McKernan | ............. | H02J 5/005 307/9.1 |
| 2016/0288656 A1* | 10/2016 | Kristof | ................. | B60L 11/182 |
| 2016/0336756 A1* | 11/2016 | Holzworth | ............. | H02J 7/025 |
| 2016/0347193 A1* | 12/2016 | Caldwell | ............. | B60L 11/1829 |
| 2017/0001531 A1* | 1/2017 | Takatsu | .................... | E04H 6/24 |
| 2017/0120757 A1* | 5/2017 | Lewis | .................... | B60L 53/12 |
| 2017/0136880 A1* | 5/2017 | Ricci | .................... | B60L 3/0015 |
| 2017/0136882 A1* | 5/2017 | Ricci | .................... | B60L 11/182 |
| 2017/0136887 A1* | 5/2017 | Ricci | .................... | B64C 39/024 |
| 2017/0136890 A1* | 5/2017 | Ricci | .................... | B60L 11/182 |
| 2017/0136892 A1* | 5/2017 | Ricci | .................... | B60L 11/182 |
| 2017/0136902 A1* | 5/2017 | Ricci | ................. | B60L 11/1825 |
| 2017/0136903 A1* | 5/2017 | Ricci | .................... | B64C 39/024 |
| 2017/0136907 A1* | 5/2017 | Ricci | .................... | B60L 3/0015 |
| 2017/0140603 A1* | 5/2017 | Ricci | .................... | B60L 11/182 |
| 2017/0182903 A1* | 6/2017 | Kwasnick | ........... | B60L 11/1835 |
| 2017/0187239 A1* | 6/2017 | Okubo | .................... | H02J 50/20 |
| 2017/0259679 A1* | 9/2017 | Widmer | ................. | B60L 53/36 |
| 2017/0361726 A1* | 12/2017 | Widmer | ................. | G01S 19/42 |
| 2018/0137972 A1* | 5/2018 | Widmer | ................. | H01F 38/14 |
| 2018/0175632 A1* | 6/2018 | Tillotson | ................. | H01F 38/14 |
| 2018/0212434 A1* | 7/2018 | McKernan | ............. | H02J 5/005 |
| 2018/0312070 A1* | 11/2018 | Caldwell | ............. | B60L 11/1829 |
| 2019/0026411 A1* | 1/2019 | Mehas | ................. | G06F 17/5009 |
| 2019/0036369 A1* | 1/2019 | Grant | ..................... | H02J 7/025 |
| 2019/0068006 A1* | 2/2019 | Ikeda | ..................... | H02J 50/90 |
| 2019/0081516 A1* | 3/2019 | Shahsavari | ............ | H02J 50/60 |

OTHER PUBLICATIONS

Kurs, A., et al: "Wireless Power Transfer via Strongly Coupled Magnetic Resonances," vol. 7, Science, 2007, pp. 83-86.

IEEE Std. C95.1—2005, "IEEE Standard for Safety Levels with Respect to Human Exposure to Radio Frequency Electromagnetic Fields, 3 kHz to 300 GHz", IEEE, Piscataway, NJ, 2006.

International Search Report and Written Opinion issued in PCT Application No. PCT/US2017/032689, dated Aug. 8, 2017, 10 pages.

International Preliminary Report on Patentability issued in PCT Application No. PCT/US2017/032689, dated Dec. 18, 2018, 6 pages.

* cited by examiner

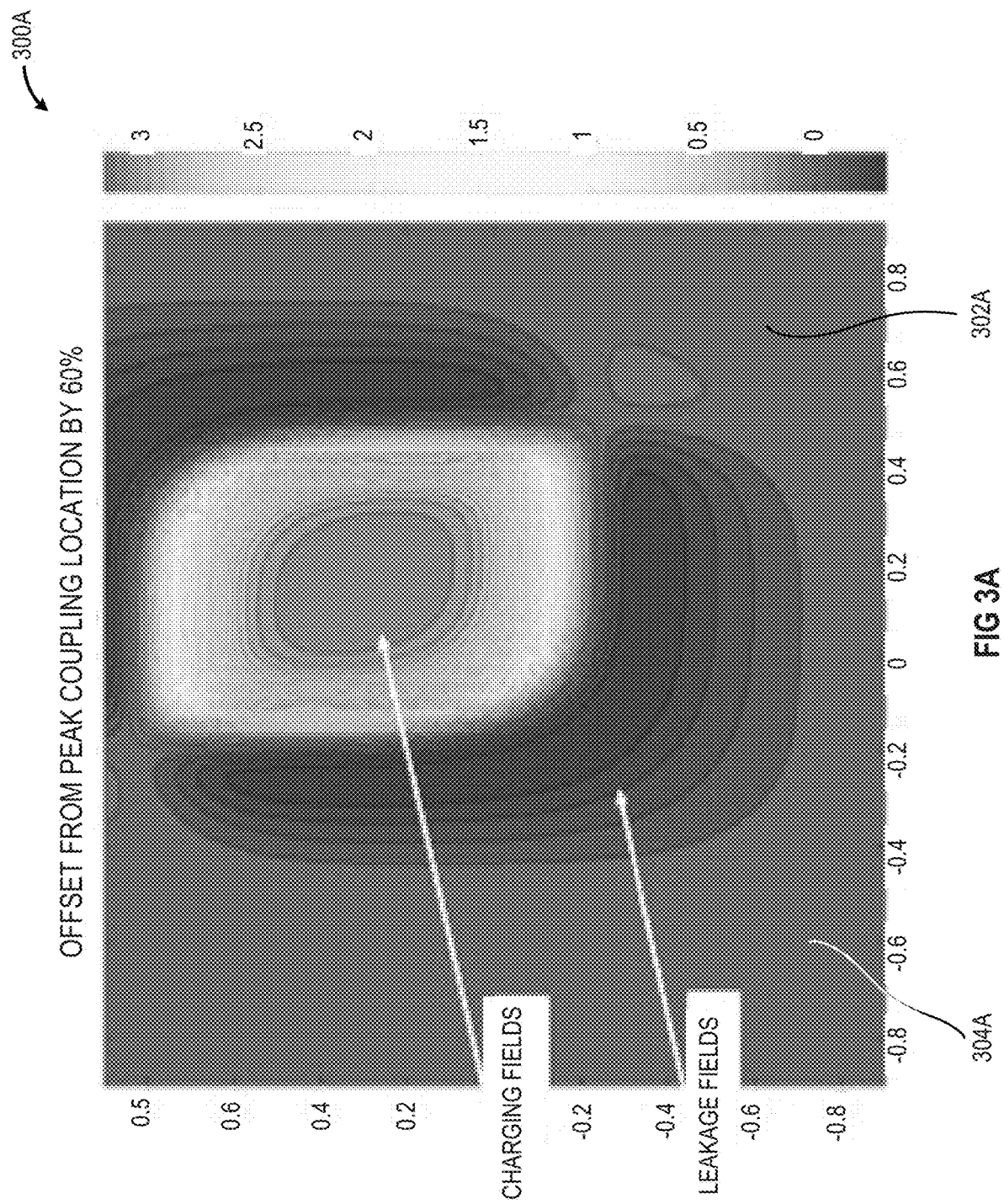

VEHICULAR INDUCTIVE POWER TRANSFER SYSTEMS AND METHODS

TECHNICAL FIELD

The present disclosure relates to inductive power transfer between an inductive power transmission coil and a vehicle mounted inductive power receiving coil.

BACKGROUND

Increasing the acceptance and use of electric vehicles provides an environmentally responsible solution for reducing air pollution and addressing the transportation needs of society while not adversely impacting the existing transportation infrastructure. One of the greatest hurdles to increasing the acceptance of battery powered vehicles is the inherent limitations in energy storage density possible using currently available battery technologies. The relatively limited energy storage density of a battery limits the practical range of battery powered vehicles to several hundred miles. The relatively slow recharge rate for batteries requires a battery powered vehicle stop for an hour of recharging for every two to three hours of travel time.

Wireless (or inductive) charging of vehicular secondary cells (e.g., rechargeable batteries) may permit reducing the rate of depletion of a vehicular battery while the vehicle remains in motion. With sufficient available power, an inductive charging system may even recharge a vehicular battery while the vehicle is motion. Thus, a more widespread adoption of wireless charging technologies is limited due technology concerns such as: the relatively poor efficiency of wireless power transfer; and, the high leakage radio frequency (RF) electromagnetic field exposure to users, particularly occupants of a vehicle.

Previous solutions have targeted increasing the power supplied to the power receiving unit in the vehicle by boosting the current supplied to the power transfer unit external to the vehicle. While such solutions may increase the power received by the power receiving unit in the vehicle, such a solution does nothing to improve the power transfer efficiency between the power transmission unit and the power receiving unit and thus does so at the expense of additional wasted power. Another solution is to increase the coupling between the power receiving unit and the power transmission unit by adding turns to the coil in the power transmission unit using a high quality-factor (i.e., a "high Q") material. High-Q materials are usually costly and thus, generally not economically feasible for widespread implementation. Additional options may include plating standard coils with high-Q materials such as silver and fabricating coils in elaborate geometries.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3A is a coupling coefficient plot for an illustrative inductive power transfer system in which the power transmission unit and the power receiving unit are 60% misaligned, in accordance with at least on embodiment of the present disclosure;

Figure 1A:
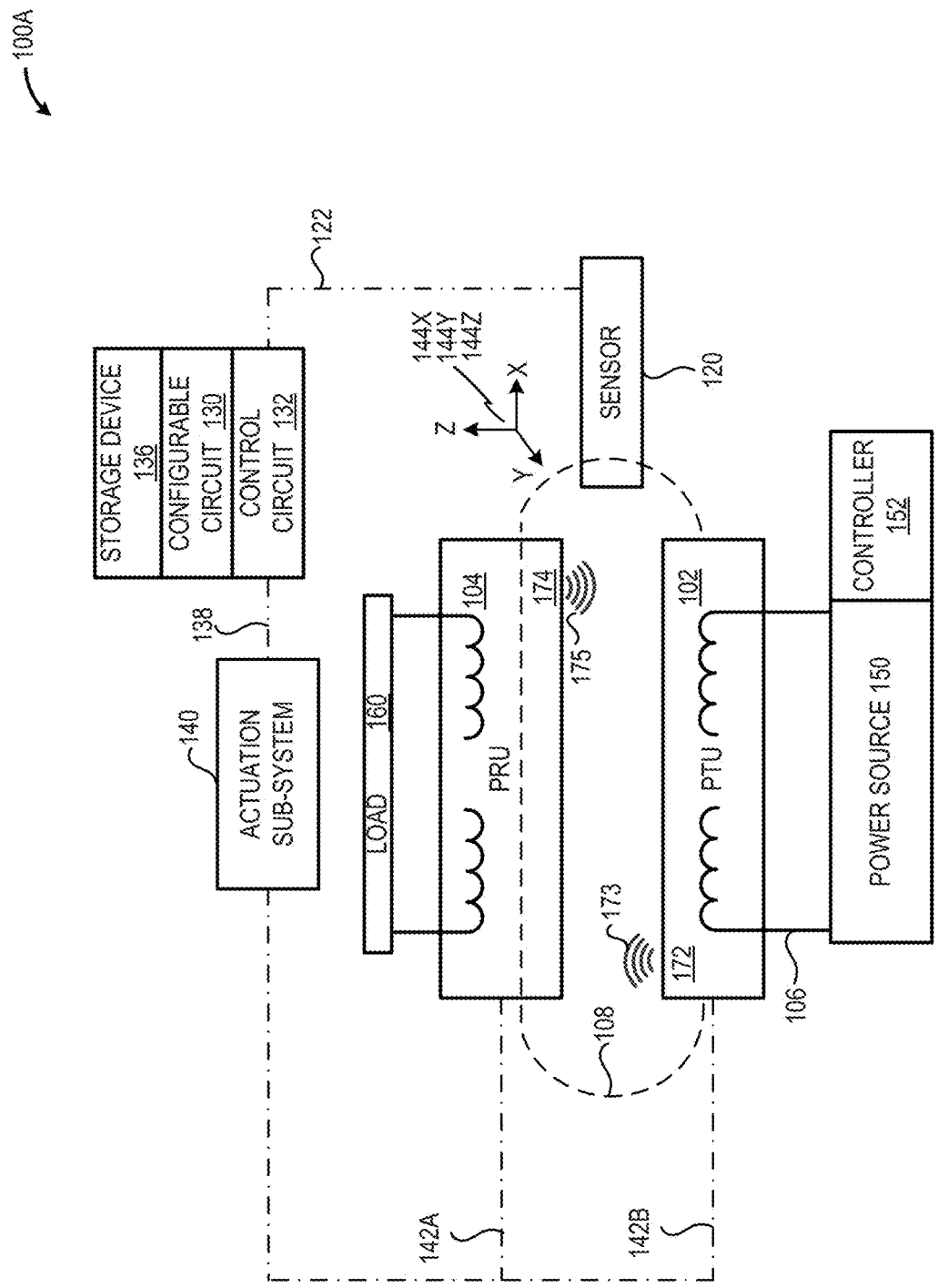
FIG. 1A depicts an illustrative inductive power transfer system that includes an inductive power transmission unit, an inductive power receiving unit, a sensor, an inductive power transfer control circuit and an actuation sub-system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The systems and methods described herein improve the power transfer efficiency in vehicular inductive power transfer systems by permitting adjustment of at least one of the inductive power receiving unit or the inductive power transmission unit in three-dimensional (3D) space. In one implementation, the position of the inductive power transmission unit may be adjusted in the 3D space to bring the inductive power transmission unit physically closer to the inductive power receiving unit prior to commencing charging. In other implementations, the position of the inductive power receiving unit may be adjusted in the 3D space prior to bring the inductive power transmission unit physically closer to the inductive power receiving unit prior to commencing charging. Such systems and methods may employ sensors and a control system that causes an actuation sub-system operably coupled to at least one of: the inductive power receiving unit or the inductive power transmission unit to position the inductive power receiving unit and the inductive power transmission unit such that the distance between the units improves the wireless power transfer efficiency of the system.

In a typical scenario, the inductive power transmission unit starts out at a greater than optimal distance from the inductive power receiving unit. For example, the inductive power transmission unit may be disposed at grade level so that the vehicle is able to travel over the inductive power transmission unit and the inductive power receiving unit may be coupled to the vehicle chassis, several inches above grade level. By raising the inductive power transmission unit and/or lowering the inductive power receiving unit, the distance between the two may be decreased and the power transfer efficiency improved without increasing the current flow to the inductive power transmission unit. The systems and methods described herein address both the distance between the inductive power transmission unit and the inductive power receiving unit as well as the alignment of the inductive power transmission unit with the inductive power receiving unit and are thus able to increase power transfer efficiency while decreasing the leakage electromagnetic fields that cause an RF exposure safety concern.

In some implementations, one or more sensing devices may be used to detect the distance between the inductive power transmission unit and the inductive power receiving unit. Such devices may include, but should not be limited to, optical devices such as three dimensional or distance sensing cameras or video devices, laser distance detection devices, or ultrasonic distance detection devices. In addition, one or more sensing devices may be used to detect the x-y alignment (i.e., the planar alignment) of the inductive power receiving unit with the inductive power transmission unit. Such devices may include, but should not be limited to, devices capable of sensing the electromagnetic fields and/or magnetic fields produced by the inductive power transmission unit.

An inductive power transfer system is provided. The system may include a means for receiving a first signal that includes information indicative of at least one inductive energy transfer parameter between an inductive power transmission unit and an inductive power receiving unit; a means for generating at least one control output including data indicative of a position in a three-dimensional (3D) space of at least one of: an inductive power transmission unit; or, an inductive power receiving unit, the position in the 3D space optimizing an inductive energy transfer between the inductive power transmission unit and the inductive power receiving unit based on the at least one inductive energy transfer parameter; and a means for communicating the at least one control output to a communicably coupled actuation sub-system, the actuation sub-system operably coupled to at least one of: the inductive power transmission unit; or, the inductive power receiving unit.

An inductive power transfer method is provided. The method may include receiving, at a power transfer control circuit interface, a first signal that includes information indicative of at least one inductive energy transfer parameter between an inductive power transmission unit and an inductive power receiving unit; generating, by the power transfer control circuit, at least one control output, the control output including data indicative of a position in a three-dimensional (3D) space of at least one of: an inductive power transmission unit; or, an inductive power receiving unit, the position in the 3D space optimizing an inductive energy transfer between the inductive power transmission unit and the inductive power receiving unit based on the at least one inductive energy transfer parameter; and communicating the at least one control output to a communicably coupled actuation sub-system, the actuation sub-system operably coupled to at least one of: the inductive power transmission unit; or, the inductive power receiving unit.

A controller is provided. The controller may include a control interface to provide at least one output to an actuation sub-system, the actuation subsystem to control, in a three-dimensional (3D) space, the position of at least one of: an inductive power transmission unit; or, an inductive power receiving unit; a sensor interface to receive a first signal that includes information indicative of at least one inductive energy transfer parameter, the inductive energy transfer parameter indicative of an inductive energy transfer between the inductive power transmission unit and the inductive power receiving unit; controller circuitry communicably coupled to the control interface and to the sensor interface; a storage device communicably coupled to the controller circuitry, the storage device including machine-readable instructions that physically transform the controller circuitry to a dedicated power transfer control circuit, the power transfer control circuit to: cause the actuation sub-system to physically position at least one of: the inductive power transmission unit; or, the inductive power receiving unit in the 3D space at a physical location that optimizes the at least one inductive energy transfer parameter.

An inductive energy transfer system is provided. The system may include a power transfer sub-system that includes one of: a power transmission unit that includes at least one power transmission coil coupleable to a power supply; or, a power receiving unit that includes at least one power receiving coil coupleable to a load; an actuation sub-system operably coupled to the power transfer-subsystem, the actuation sub-system to move the power transfer sub-system in three dimensional (3D) space; at least one sensor to provide at least one signal that includes data indicative of at least one inductive energy transfer parameter; control circuitry communicably coupled to the actuation sub-system and to the at least one sensor; a storage device containing machine-readable instructions communicably coupled to the control circuitry, the machine-readable instructions, when executed by the control circuitry, transform at least a portion of the control circuitry to a dedicated power transfer control circuit, the power transfer control circuit to: cause the actuation sub-system to physically position the power transfer sub-system in the 3D space at a location that optimizes the at least one inductive energy transfer parameter.

A storage device that includes machine-readable instructions that when executed by controller circuitry transform the controller circuitry to an inductive power transfer control circuit is provided. The machine-readable instructions may cause the inductive power transfer control circuit to: receive a first signal that includes information indicative of at least one inductive energy transfer parameter between an inductive power transmission unit and an inductive power receiving unit; generate at least one control output, the control output including data indicative of a position in a three-dimensional (3D) space of at least one of: an inductive power transmission unit; or, an inductive power receiving unit, the position in the 3D space based on an inductive energy transfer between the inductive power transmission unit and the inductive power receiving unit based on the at least one inductive energy transfer parameter; and communicate the at least one control output to a communicably coupled actuation sub-system, the actuation sub-system operably coupled to at least one of: the inductive power transmission unit or the inductive power receiving unit.

As used herein, the term "inductive power transfer system" refers to both the inductive power transmission unit and the corresponding inductive power receiving unit. The inductive power transfer system may include a sideband communication channel to transfer data and/or information between the inductive power transmission unit and the inductive power receiving unit. In addition, or alternatively, the inductive power transfer system may exchange data and/or information between the inductive power transmission unit and the inductive power receiving unit by modulating at least a portion of the data or information on the electromagnetic field produced by the inductive power transmission unit.

As used herein, the terms "power transmission unit" and "inductive power transmission unit" refer to a device, system, or any combination and/or number of devices and systems capable of receiving an input electrical energy/current and transforming at least a portion of the received input electrical energy/current to an electromagnetic field output. The electromagnetic field produced by the power transmission unit/inductive power transmission unit is capable of providing at least a portion of the electrical energy/current received by the power transmission unit/inductive power transmission unit to a power receiving unit/inductive power receiving unit placed or otherwise positioned in the electromagnetic field.

As used herein, the terms "power receiving unit" and "inductive power receiving unit" refer to a device, system, or any combination and/or number of devices and systems capable of generating a current output when placed or otherwise positioned in an electromagnetic field produced by a power transmission unit/inductive power transmission unit.

As used herein, the terms "top," "bottom," "up," "down," "upward," "downward," "upwardly," "downwardly" and similar directional terms should be understood in their relative and not absolute sense. Thus, a component described as being "upwardly displaced" may be considered "laterally displaced" if the device carrying the component is rotated 90 degrees and may be considered "downwardly displaced" if the device carrying the component is inverted.

Such implementations should be considered as included within the scope of the present disclosure.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIG. 1A depicts an illustrative inductive power transfer system 100A that includes an inductive power transmission unit 102, an inductive power receiving unit 104, a sensor 120, a control circuit 130 and an actuation sub-system 140, in accordance with at least one embodiment of the present disclosure. In embodiments, one or more sensors 120 may measure, sense, or otherwise detect one or more inductive power transfer parameters that indicate or otherwise correspond to the power transferred from the inductive power transmission unit 102 to the inductive power receiving unit 104. In embodiments, one or more sensors 120 may measure, sense, or otherwise detect one or more inductive power transfer parameters that indicate or otherwise correspond to the strength and/or density of the magnetic field produced by the inductive power transfer system 100A.

The one or more sensors 120 communicably couple to the inductive power transfer control circuit 132. In embodiments, the one or more sensors 120 may communicably couple to a communications interface coupled to the inductive power transfer control circuit 132. The signal(s) 122 produced or generated by the one or more sensors 120 include information and/or data indicative of one or more inductive power transfer parameters. Such inductive power transfer parameters may be measured directly, for example via the current produced in the power receiving unit/inductive power receiving unit 104. Such inductive power transfer parameters may be measured indirectly, for example via the magnetic fields produced by the power transmission unit/inductive power transmission unit 102. Such inductive power transfer parameters may include measuring the charging rate of a secondary storage device (e.g., rechargeable battery, supercapacitor, ultracapacitor) coupled to the power receiving unit/inductive power receiving unit 104.

In embodiments, the one or more sensors 120 may include one or more sensors 120 useful for protecting the health and/or safety of personnel proximate the inductive power transfer system 100A and/or operating the device or load to which the power receiving unit 104 is conductively coupled. For example, the one or more sensors 120 may detect the presence of occupants in an electrically powered vehicle equipped with a power receiving unit 104.

In embodiments, a configurable circuit 130 may execute machine-readable instructions that transform at least a portion of the configurable circuit 130 to the specialized inductive power transfer control circuit 132. All or a portion of the machine-readable instructions may be stored or otherwise retained in a storage device 136 communicably coupled to the configurable circuit 130. In embodiments, the configurable circuit 130 may include one or more processors situated in separate components, or alternatively, may comprise one or more processing cores embodied in a single component (e.g., in a System-on-a-Chip (SOC) configuration). Example processors may include various x86-based microprocessors available from the Intel® Corporation (Santa Clara, Calif.) including those in the Pentium®, Xeon®, Itanium®, Celeron®, Atom®, Core i-series product families.

The inductive power transfer control circuit 132 communicates one or more control outputs 138 to the actuation sub-system 140. In some implementations, the inductive power transfer control circuit 132 operably couples to and alters, adjusts, or controls the physical positioning of the power transmission unit 102 with respect to the power receiving unit 104. For example, the inductive power transfer control circuit 132 may cause the actuation sub-system 140 to physically position the power transmission unit 104 a defined distance from the power transmission unit 102 to maximize the inductive power transfer from the power transmission unit 102 to the power receiving unit 104.

In some implementations, the inductive power transfer control circuit 132 operably couples to and alters, adjusts, or controls the physical positioning of the power receiving unit 104 with respect to the power transmission unit 102. For example, the inductive power transfer control circuit 132 may cause the actuation sub-system 140 physically position the power receiving unit 104 a defined distance from the power transmission unit 102 to maintain the magnetic field intensity within the vehicle carrying the power receiving unit 104 at a level safe for human occupants. The inductive power transfer from the power transmission unit 102 to the power receiving unit 104.

The actuation sub-system 140 may include any combination of devices and/or systems capable of physically displacing or positioning the power transmission unit 102 and/or the power receiving unit 104 in a three-dimensional (3D) space. In some implementations, the actuation sub-system 140 may position the power transmission unit 102 or the power receiving unit 104 in a 3D space defined by three orthogonal axes 144x, 144y, and 144z.

In embodiments, the actuation sub-system 140 may be operably coupled via any number of systems or devices 142A to the power receiving unit 104. Such an arrangement permits the control circuit 132 to position the power receiving unit 104 with respect to the power transmission unit 102 in a defined location within the 3D space. In some implementations, the defined location within the 3D space may include a defined location that maximizes power transfer to the power receiving unit 104. In some implementations, the defined location within the 3D space may include a defined location that minimizes the impact of the magnetic fields 108 produced by the power transmission unit 102 on the occupants of the vehicle. In some implementations, the defined location within the 3D space may include a defined location that maintains compliance with one or more regulations limiting the exposure of the occupants of the vehicle to a defined magnetic field strength.

In embodiments, the actuation sub-system 140 may be operably coupled via any number of systems or devices 142B to the power transmission unit 102. Such an arrangement permits the inductive power transfer control circuit 132 to position the power transmission unit 102 with respect to the power receiving unit 104 such that the power transfer to the power receiving unit 104 is maximized and/or minimizes the effect of the magnetic fields 108 produced by the power transmission unit 102 on the vehicle occupants. In some implementations, the actuation sub-system 140 may be operably coupled to both the power transmission unit 102 and the power receiving unit 104.

In embodiments, the actuation sub-system 140 may include any number or combination of mechanical devices, electrical devices, and/or electromechanical devices capable of physically positioning, supporting and maintaining the position of the power transmission unit 102. In embodiments, the actuation sub-system 140 may include any number or combination of mechanical devices, electrical devices, and/or electromechanical devices capable of physically positioning, supporting and maintaining the position of the power receiving unit 104. Such systems may include, but are not limited to, hydraulically operated systems, mechanically operated systems and/or electrically operated systems.

The power transmission unit 102 may include any type, size, number, or combination of devices and/or systems capable generating a magnetic field 108 sufficient to transfer electrical energy or power to the power receiving unit 104. In some implementations, the power transmission unit 102 may include a number of coils 106 disposed in a housing or enclosure that is transparent to (i.e., does not attenuate or causes minimal attenuation of) the magnetic field 108 generated by the power transmission unit 102. In some implementations, the power transmission unit 102 may include a housing or enclosure operably coupled to the actuation sub-system 140 such that the power transmission unit 102 is displaceable to or positionable in a defined location in 3D space. In some implementations, the defined location within the 3D space may include a defined location that maximizes power transfer from the power transmission unit 102 to the power receiving unit 104. In some implementations, the defined location within the 3D space may include a defined location that minimizes the impact of the magnetic fields 108 produced by the power transmission unit 102 on the occupants of the vehicle. In some implementations, the defined location within the 3D space may include a defined location that maintains compliance with one or more regulations limiting the exposure of the occupants of the vehicle to a defined magnetic field strength.

In some implementations, the power transmission unit 102 may be at least partially disposed and/or embedded in a motor vehicle accessible surface of a roadway. For example, the power transmission unit 102 may be embedded in one or more lanes of a roadway or road surface such that electric vehicles carrying a power receiving unit 104 are able to receive power from the power transmission unit 102 as they travel along the one or more lanes of the roadway. Such an arrangement may beneficially reduce the draw from energy storage devices carried by the vehicle, thereby increasing the range (i.e., the distance traveled between recharging of the energy storage devices) of the vehicle. In some instances, such an arrangement may further advantageously permit recharging of the energy storage devices carried by an electric vehicle as the vehicle travels along the one or more lanes of the roadway in which the power transmission unit 102 is disposed.

The power transmission unit 102 may be coupled to a power source 150 which supplies the energy consumed by the power transmission unit 102 in generating the magnetic field 108. The power source 150 may include an electrical power source such as a commercial alternating current distribution network operated by one or more utilities. The electrical power source may include one or more renewable energy sources, such as any number of electricity producing wind turbines, geothermal generating stations, or solar cell arrays. Such renewable energy sources may be disposed, for example, along a roadway containing embedded power transmission unit(s) 104.

At least one transceiver 172 may be disposed in, on, or about the power transmission unit 102. In some implementations, the transceiver 172 may unidirectionally or bidirectionally communicate 173 with a transceiver 174 disposed in, on, or about the power receiving unit 104. In some implementations, the transceiver 172 may unidirectionally or bidirectionally communicate 173 with the inductive power transfer control circuit 132.

At least one transceiver 174 may be disposed in, on, or about the power receiving unit 104. In some implementations, the transceiver 174 may unidirectionally or bidirectionally communicate 175 with the transceiver 172 disposed in, on, or about the power transmission unit 102. In some implementations, the transceiver 174 may unidirectionally or bidirectionally communicate 175 with the control circuit 152 that controls one or more operational aspects (e.g., current, voltage, phase) of the power supply to the power transmission unit 102.

Figure 1B:
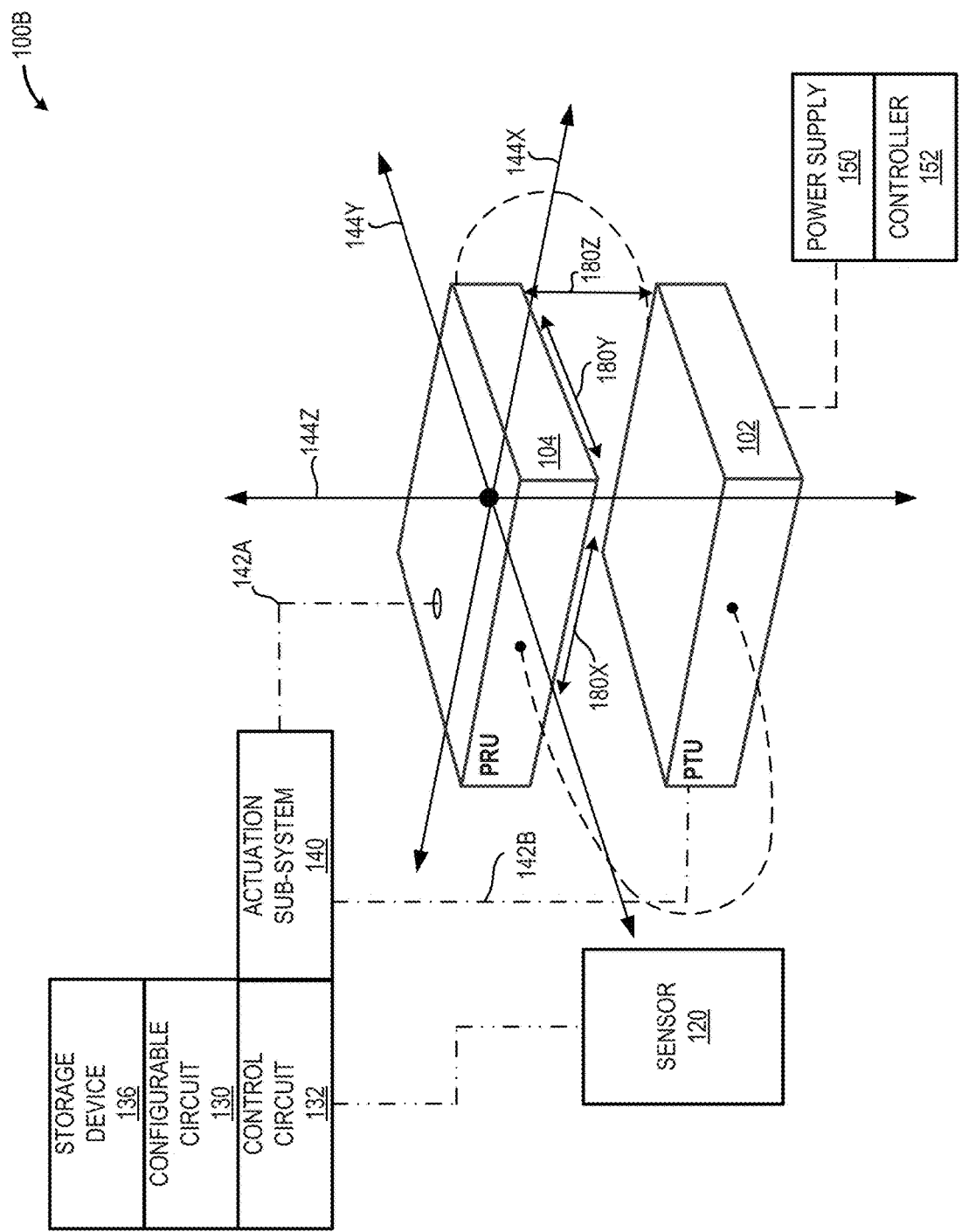
FIG. 1B is a perspective view of an illustrative inductive power transfer system that includes an inductive power transmission unit, an inductive power receiving unit, a sensor, a control circuit, and an actuation sub-system, in accordance with at least one embodiment of the present disclosure.

FIG. 1B is a perspective view of an illustrative inductive power transfer system 100B that includes an inductive power transmission unit 102, an inductive power receiving unit 104, a sensor 120, an inductive power transfer control circuit 130 and an actuation sub-system 140, in accordance with at least one embodiment of the present disclosure. As depicted in FIG. 1B, the actuation sub-system 140 may position the power receiving unit 104 at a defined location in the 3D space formed by the orthogonal axes 144$x$, 144$y$, and 144$z$.

The actuation sub-system 140 may adjust the position of the power receiving unit 104 along one or more of the three dimensional axes 144$x$, 144$y$, 144$z$ to any defined location within the 3D space. In some instances, the actuation sub-system 140 may adjust the distance 180$z$ between the power receiving unit 104 and the power transmission unit 102 to a defined spacing that maximizes the power transfer from the power transmission unit 102 to the power receiving unit 104. In some instances, the actuation sub-system 140 may align the power receiving unit 104 with the power transmission unit 102 by displacing 180$x$ the power receiving unit 104 along a first axis 144$x$ and/or displacing 180$y$ the power receiving unit 104 along a second, orthogonal axis 144$y$.

Figure 2B:
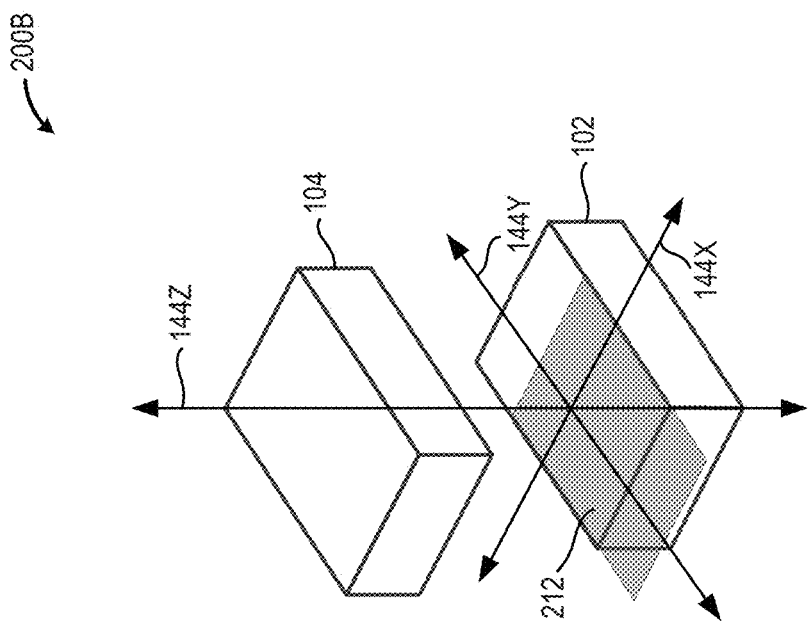
FIG. 2B is a perspective view of an illustrative inductive power transfer system that depicts an illustrative misalignment between an example power transmission unit and an example power receiving unit along a first axis, in accordance with at least on embodiment of the present disclosure.
Figure 2A:
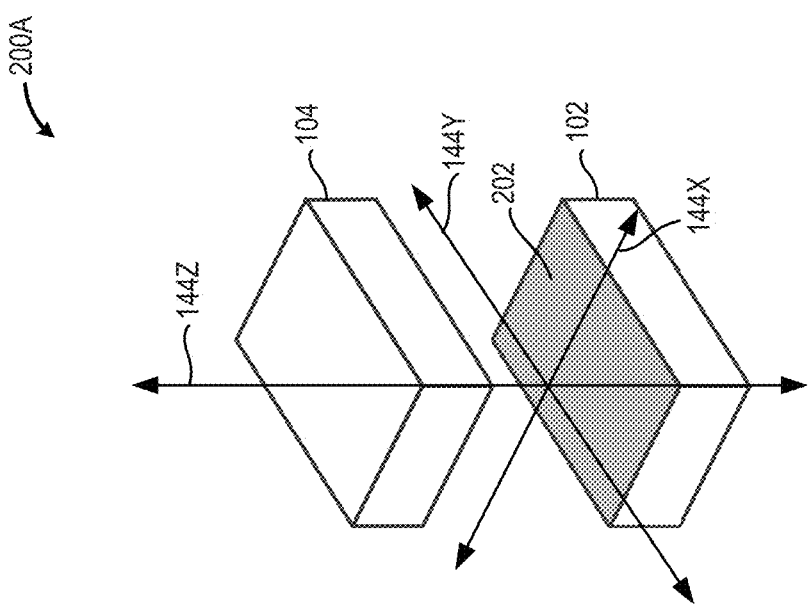
FIG. 2A is a perspective view of an illustrative inductive power transfer system that depicts an illustrative alignment between an example power transmission unit and an example power receiving unit, in accordance with at least on embodiment of the present disclosure.

FIGS. 2A, 2B, 2C, and 2D are perspective views of an illustrative inductive power transfer systems 200A, 200B, 200C, and 200D, respectively, each of which depicts an illustrative alignment between an example power transmission unit 102 and an example power receiving unit 104, in accordance with at least on embodiment of the present disclosure. FIG. 2A depicts an inductive power system 200A in which the power transmission unit 102 and the power receiving unit 104 are aligned along a first axis 144$x$ and along a second axis 144$y$. In such an arrangement the shadow 202 of the power receiving unit 104 aligns with and corresponds to the upper surface of the power transmission unit 102. The arrangement depicted in FIG. 2A provides the greatest power transfer for a given separation distance along axis 144$z$.

FIG. 2B depicts an inductive power system 200B in which the power transmission unit 102 and the power receiving unit 104 are aligned along a first axis 144$x$ and misaligned along a second axis 144$y$. In such an arrangement the shadow 202 of the power receiving unit 104 is shifted and fails to correspond to the upper surface of the power transmission unit 102. The arrangement depicted in FIG. 2B provides a reduced power transfer for a given separation distance along axis 144$z$ than the arrangement depicted in FIG. 2A due to the misalignment.

Figure 2D:
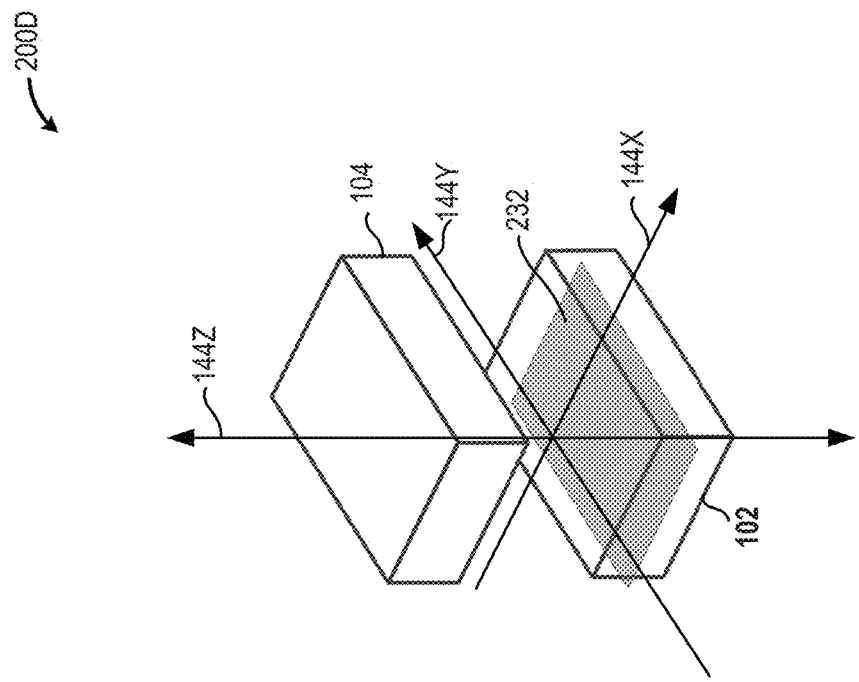
FIG. 2D is a perspective view of an illustrative inductive power transfer system that depicts an illustrative misalignment between an example power transmission unit and an example power receiving unit along a first axis and a second axis, in accordance with at least on embodiment of the present disclosure.
Figure 2C:
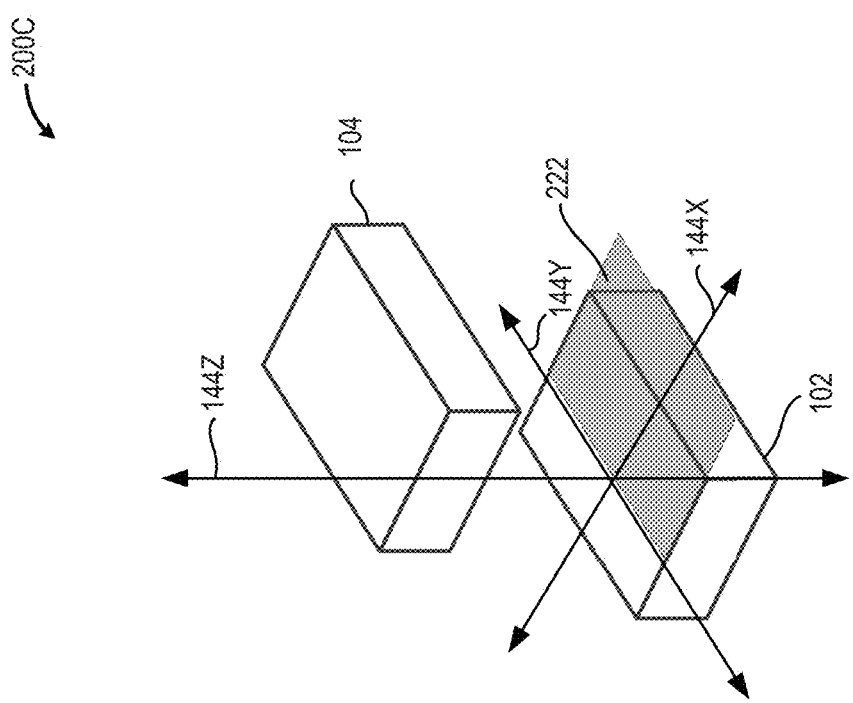
FIG. 2C is a perspective view of an illustrative inductive power transfer system that depicts an illustrative misalignment between an example power transmission unit and an example power receiving unit along a second axis, in accordance with at least on embodiment of the present disclosure.

FIG. 2C depicts an inductive power system 200C in which the power transmission unit 102 and the power receiving unit 104 are misaligned along a first axis 144$x$ and aligned along a second axis 144$y$. In such an arrangement the shadow 202 of the power receiving unit 104 is shifted and fails to correspond to the upper surface of the power transmission unit 102. The arrangement depicted in FIG. 2C provides a reduced power transfer for a given separation distance along axis 144z than the arrangement depicted in FIG. 2A due to the misalignment.

FIG. 2D depicts an inductive power system 200D in which the power transmission unit 102 and the power receiving unit 104 are misaligned along a first axis 144x and misaligned along a second axis 144y. In such an arrangement the shadow 202 of the power receiving unit 104 is shifted and fails to correspond to the upper surface of the power transmission unit 102. The arrangement depicted in FIG. 2D provides a reduced power transfer for a given separation distance along axis 144z than the arrangement depicted in FIG. 2A due to the misalignment.

FIGS. 3A, 3B, 3C, 3D, 3E, and 3F are coupling coefficient plots 300A, 300B, 300C, 300D, 300E, and 300F for a number of illustrative inductive power transfer systems, respectively, each of which depicts an illustrative charging field 302 and an illustrative leakage field 304 between a power transmission unit 102 and a power receiving unit 104, in accordance with at least on embodiment of the present disclosure.

In some implementations, the actuation subsystem 140 may align the power transmission unit 102 with the power receiving unit 104 using, at least in part, one or more parameters of the charging field 302. Such may include, for example, maximizing the area of the charging field 302 and/or maximizing the area of the charging field 302 with respect to the leakage field 304. Such may include, for example, maximizing a measured strength of the charging field 302. Such may include, for example, maximizing a ratio of the measured strength of the charging field 302 to the measured strength of the leakage field 304.

In some implementations, the actuation subsystem 140 may align the power transmission unit 102 with the power receiving unit 104 using, at least in part, one or more parameters of the leakage field 304. Such may include, for example, minimizing the area of the leakage field 304 and/or minimizing the area of the leakage field 304 with respect to the charging field 302. Such may include, for example, minimizing a measured strength of the leakage field 304. Such may include, for example, minimizing a ratio of the measured strength of the leakage field 304 to the measured strength of the charging field 302.

FIG. 3A depicts a coupling coefficient plot 300A inductive power system in which the power transmission unit 102 and the power receiving unit 104 are offset by approximately 60%. Evidenced in FIG. 3A are the relatively small charging fields 302A and the relatively large leakage fields 304A which contribute to losses in the system and decrease the overall efficiency of the inductive power transfer system.

Figure 3B:
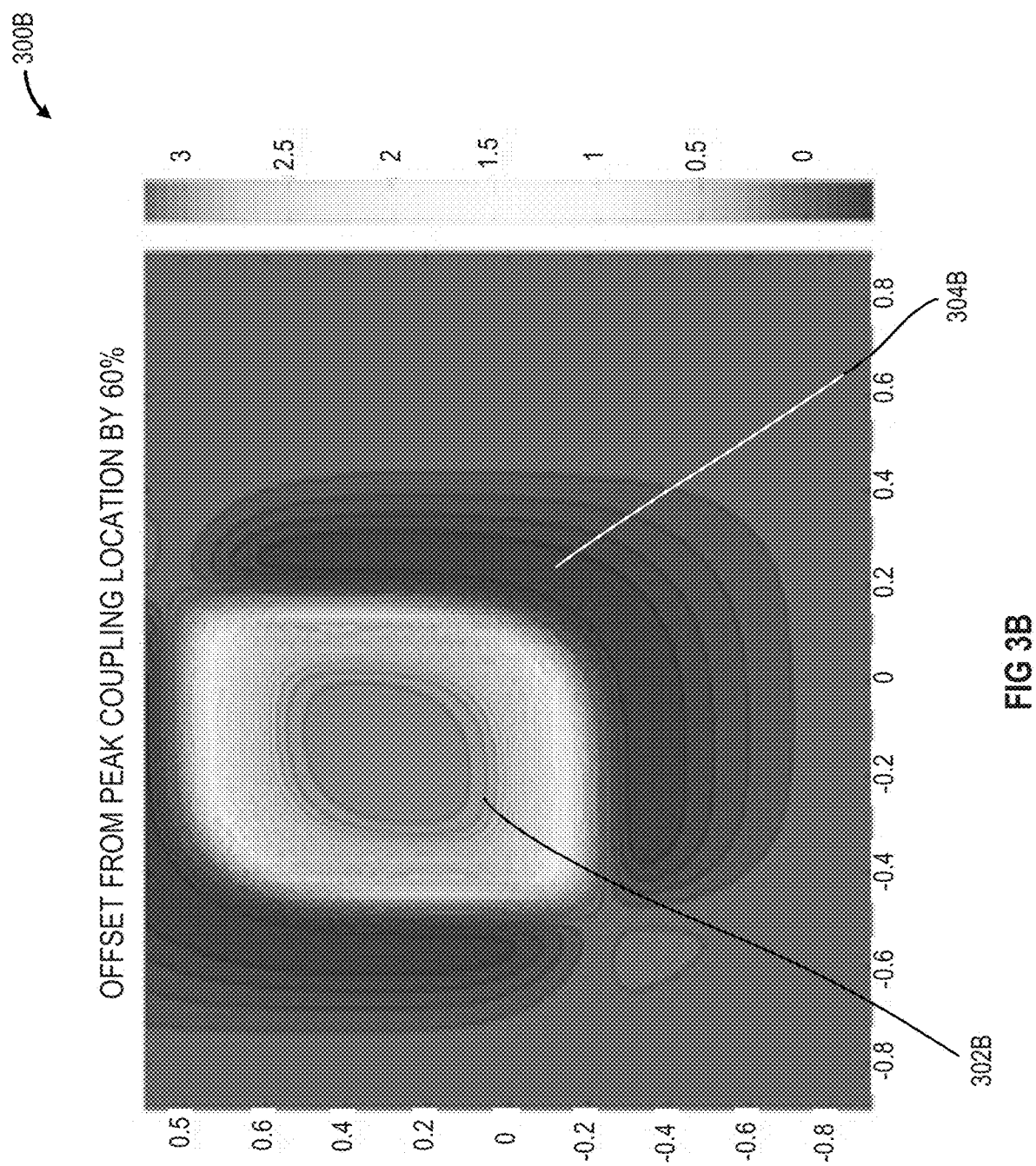
FIG. 3B is another coupling coefficient plot for an illustrative inductive power transfer system in which the power transmission unit and the power receiving unit are 60% misaligned, in accordance with at least on embodiment of the present disclosure.

FIG. 3B depicts a coupling coefficient plot 300B inductive power system in which the power transmission unit 102 and the power receiving unit 104 are offset by approximately 60%. Again, evidenced in FIG. 3B are the relatively small charging fields 302B and the relatively large leakage fields 304B which contribute to losses in the system and decrease the overall efficiency of the inductive power transfer system.

Figure 3C:
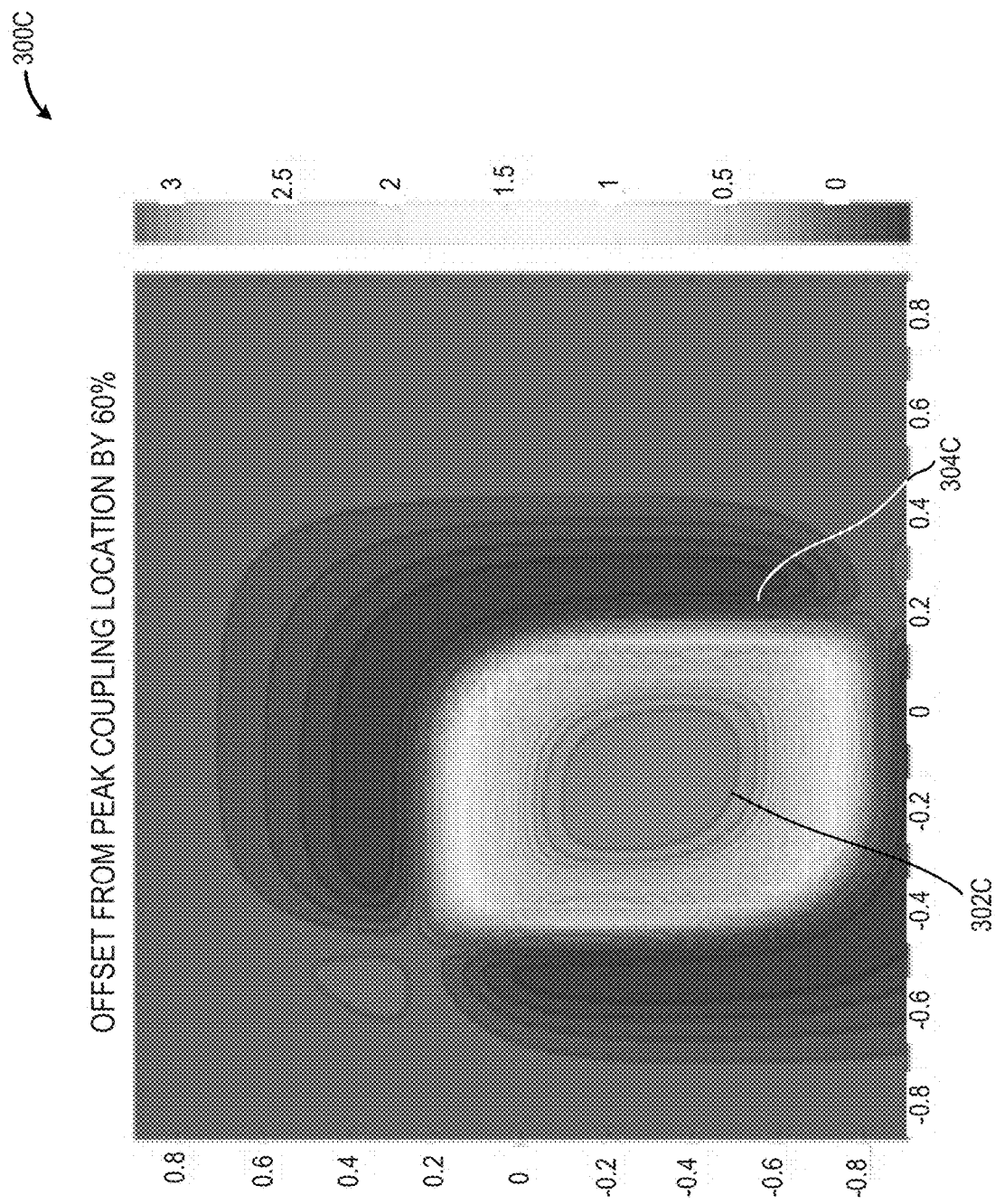
FIG. 3C is another coupling coefficient plot for an illustrative inductive power transfer system in which the power transmission unit and the power receiving unit are 60% misaligned, in accordance with at least on embodiment of the present disclosure.

FIG. 3C depicts a coupling coefficient plot 300C inductive power system in which the power transmission unit 102 and the power receiving unit 104 are offset by approximately 60%. Again, evidenced in FIG. 3C are the relatively small charging fields 302C and the relatively large leakage fields 304C which contribute to losses in the system and decrease the overall efficiency of the inductive power transfer system.

Figure 3D:
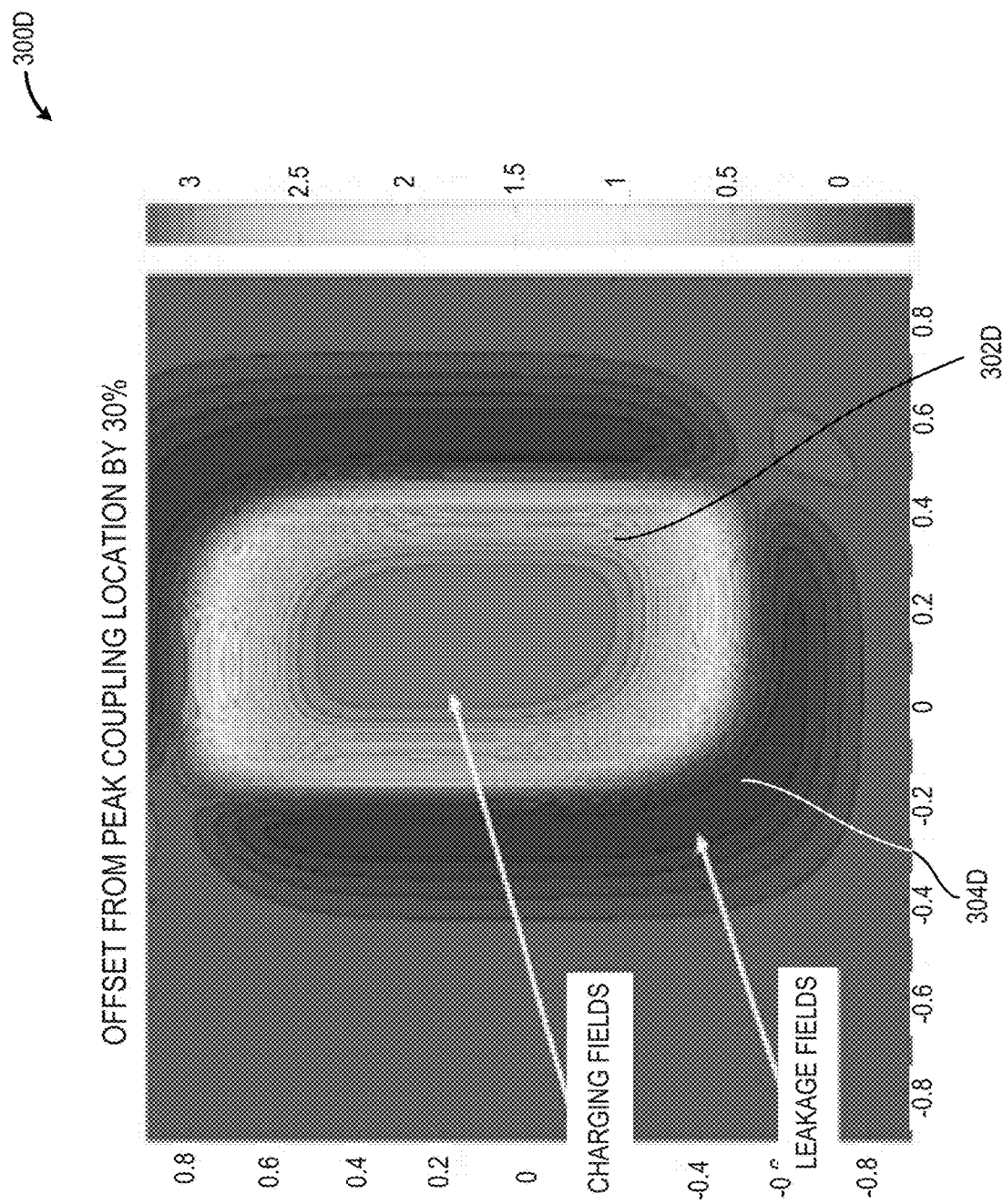
FIG. 3D is a coupling coefficient plot for an illustrative inductive power transfer system in which the power transmission unit and the power receiving unit are 30% misaligned, in accordance with at least on embodiment of the present disclosure.

FIG. 3D depicts a coupling coefficient plot 300D inductive power system in which the power transmission unit 102 and the power receiving unit 104 are offset by approximately 30%. As evidenced in FIG. 3D, the charging field 302D is somewhat larger than the charging fields 302A, 302B, and 302C in FIGS. 3A, 3B, and 3C, respectively. Also as evidence in FIG. 3D, the leakage field 304D is somewhat smaller than the relatively large leakage fields 304A, 304B, and 304C depicted in FIGS. 3A, 3B, and 3C, respectively. Thus, with the greater alignment between the power transmission unit 102 and the power receiving unit 104 depicted in FIG. 3D, losses are reduced and efficiency increased over the misaligned systems depicted in FIGS. 3A, 3B, and 3C.

Figure 3E:
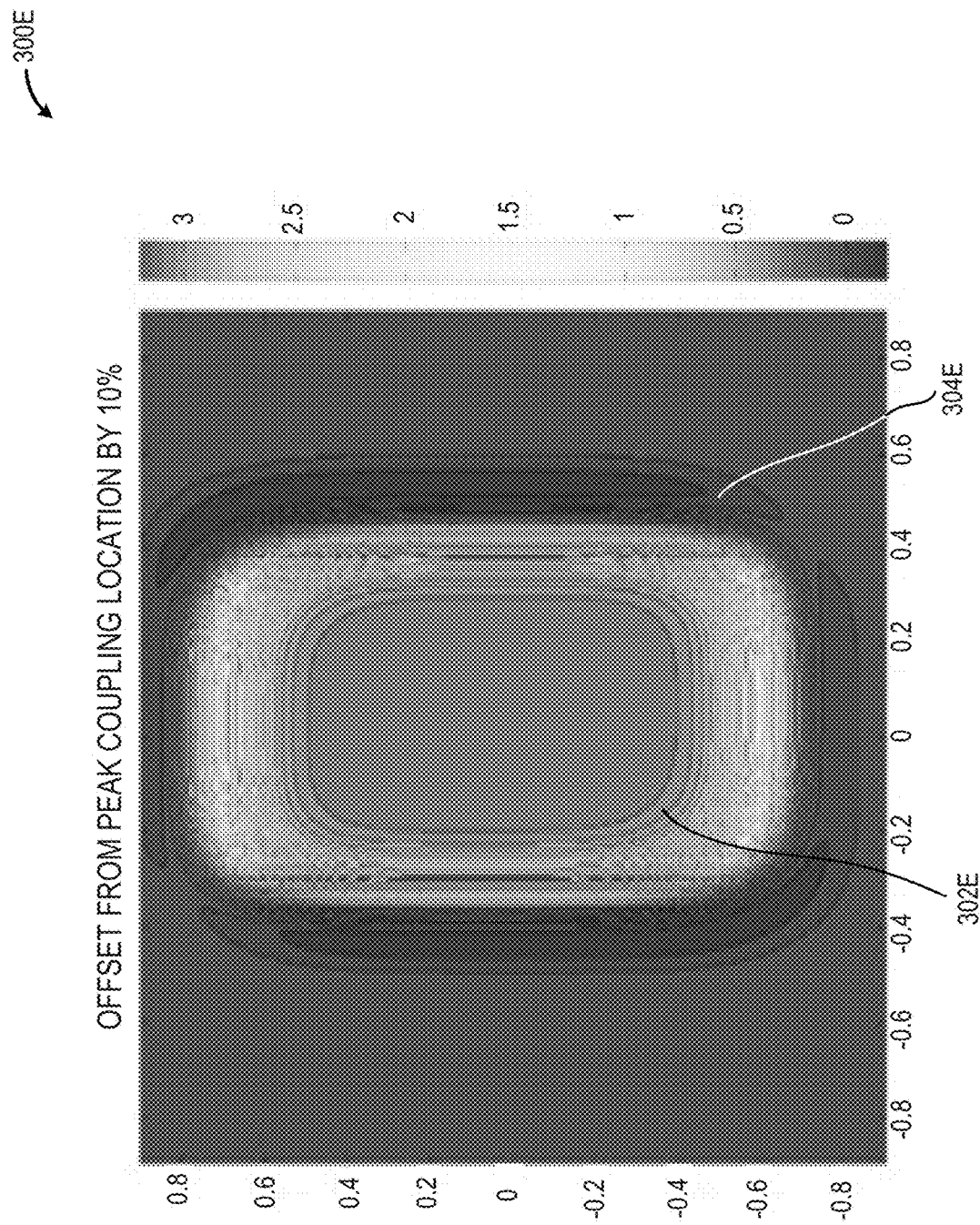
FIG. 3E is a coupling coefficient plot for an illustrative inductive power transfer system in which the power transmission unit and the power receiving unit are 10% misaligned, in accordance with at least on embodiment of the present disclosure.

FIG. 3E depicts a coupling coefficient plot 300E inductive power system in which the power transmission unit 102 and the power receiving unit 104 are offset by approximately 10%. As evidenced in FIG. 3E, the charging field 302E is demonstrably larger than the charging fields 302A, 302B, 302C, and 302D in FIGS. 3A, 3B, 3C, and 3D, respectively. Also, as evidenced in FIG. 3E, the leakage field 304E is significantly smaller than the relatively large leakage fields 304A, 304B, 304C, and 304D depicted in FIGS. 3A, 3B, 3C, and 3D, respectively. Thus, with the greater alignment between the power transmission unit 102 and the power receiving unit 104 depicted in FIG. 3E, losses are reduced and efficiency significantly improved over the misaligned systems depicted in FIGS. 3A, 3B, 3C, and 3D.

Figure 3F:
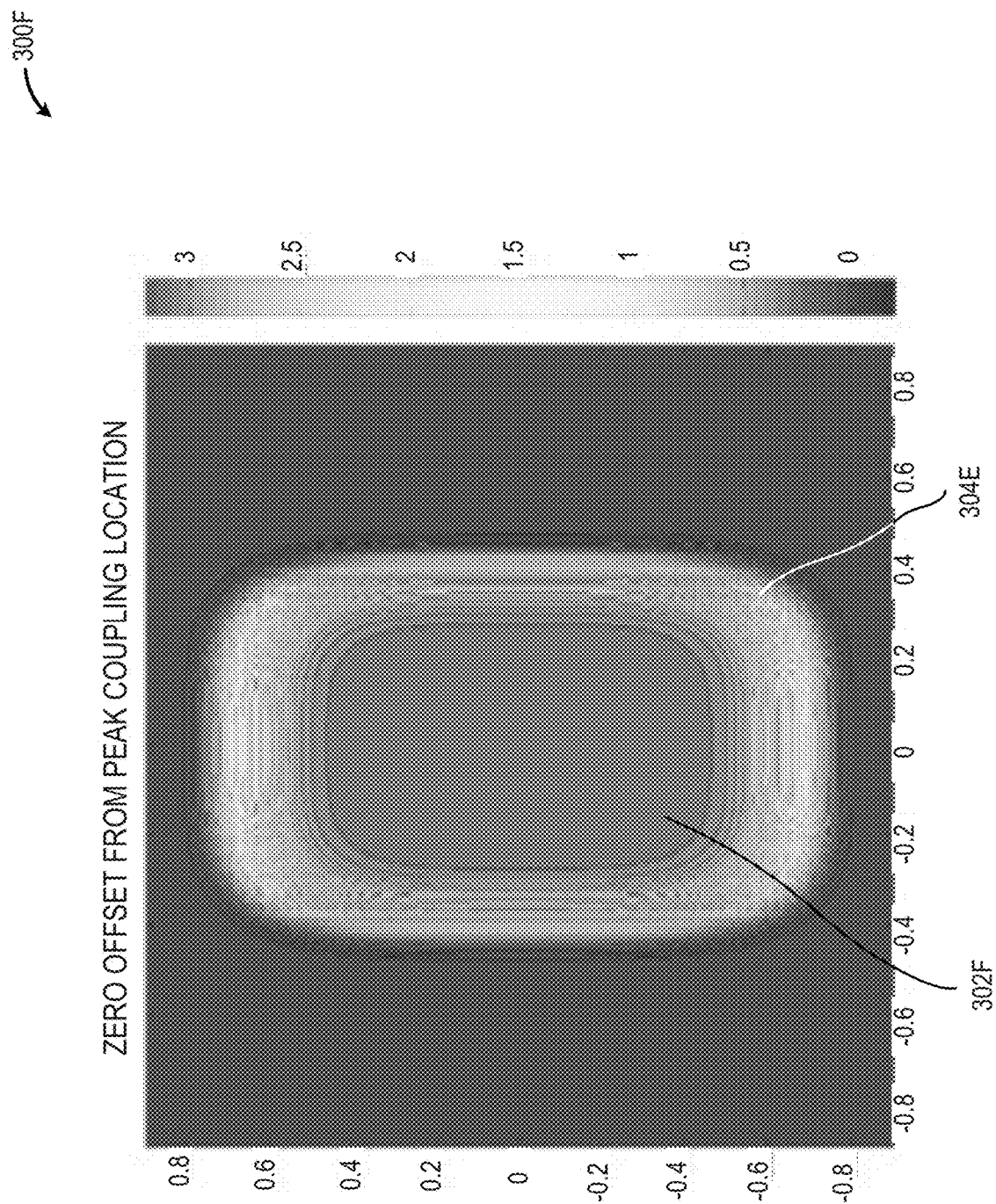
FIG. 3F is a coupling coefficient plot for an illustrative inductive power transfer system in which the power transmission unit and the power receiving unit are aligned, in accordance with at least on embodiment of the present disclosure.

FIG. 3F depicts a coupling coefficient plot 300F inductive power system in which the power transmission unit 102 and the power receiving unit 104 are aligned (i.e., not offset, or an offset of 0%). As evidenced in FIG. 3F, the charging field 302E extends across the surface of the power transmission unit 102 and is substantially larger than the charging fields 302A, 302B, 302C, 302D, and 302E in FIGS. 3A, 3B, 3C, 3D, and 3E respectively. Also, as evidenced in FIG. 3F, the leakage field 304F is essentially eliminated. Thus, with complete alignment between the power transmission unit 102 and the power receiving unit 104 depicted in FIG. 3F, losses are essentially eliminated and efficiency significantly improved over the misaligned systems depicted in FIGS. 3A, 3B, 3C, 3D, and 3E.

Figure 4:
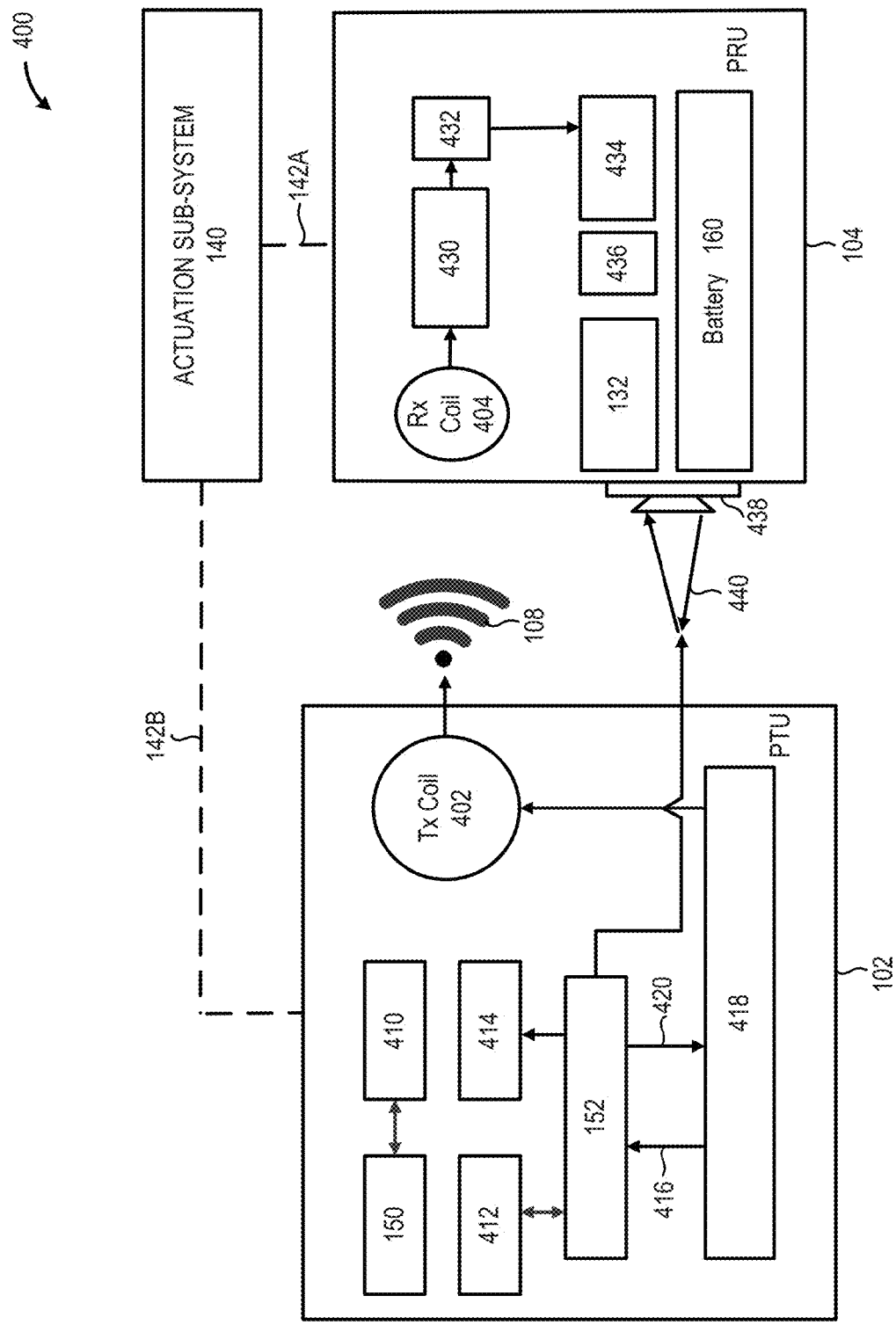
FIG. 4 is a block diagram of another illustrative inductive power transfer system that includes an inductive power transmission unit, an inductive power receiving unit, a sensor, an inductive power transfer control circuit and an actuation sub-system, in accordance with at least one embodiment of the present disclosure.

FIG. 4 depicts a block diagram of an illustrative inductive power transfer system 400 that includes an inductive power transmission unit 102, an inductive power receiving unit 104, a sensor 120, an inductive power transfer control circuit 132 and an actuation sub-system 140, in accordance with at least one embodiment of the present disclosure. In some implementations, one or more sensors 438 provide an indication of the distance and/or alignment of the power transmission unit 102 and the power receiving unit 104. The one or more sensors 438 may include one or more optical distance measuring devices such as a RealSense® three-dimensional camera as supplied by Intel®, Corp. (Santa Clara, Calif.). The one or more sensors 438 may include one or more laser range finding (e.g., LIDAR) systems 440. Maintaining an optimal distance between the power transmission unit 102 and the power receiving unit 104 can maximize the inductive power transfer 108 from the power transmission unit 102 to the power receiving unit 104. In at least some implementations, one or more signals that include information and/or data representative of the distance between the power transmission unit 102 and the power receiving unit 104 may be communicated from the power receiving unit 104 to the power transmission unit 102.

As depicted in FIG. 4, the power transmission unit 102 may include a power supply 150 operably coupled to one or more voltage regulators 410. The power transmission unit 102 may additionally include one or more power transmission unit controllers 152. The one or more power transmission unit controllers 152 may include, but are not limited to, any number and/or combination of control circuits, controllers, processors, microprocessors, digital signal processors, systems on a chip, or similar configurable circuits capable of initiating, maintaining, and controlling the flow of energy from the power transmission unit 102 to the power receiving unit 104. In embodiments, the control circuit 152 may communicably couple to one or more wired or wireless communication interfaces 412, such as one or more universal serial bus (USB) interfaces, one or more IEEE 802.11 (WiFi) interfaces, and/or one or more IEEE 802.3 (Ethernet) interfaces. In embodiments, the control circuit 152 may communicably couple to one or more output devices 414, such as one or more visual output devices, one or more audio output devices, or one or more touchscreen input/output devices.

The power transmission unit 102 also includes a number of analog transmission circuits 418. The analog transmission circuits 418 may provide one or more feedback signals 416 to the power transmission unit controller 152. Such signals may include, but are not limited to, messages containing information and/or data representative of one or more parameters or aspects of the energy wirelessly transferred from the power transmission unit 102 to the power receiving unit 104. The analog transmission circuits 418 may receive one or more control signals 416 from the power transmission unit controller 152. Such signals may, for example, include signals that optimize the transmission of energy from the power transmission unit 102 to the power receiving unit 104. Such signals may, for example, include one or more signals that alter, control, or adjust the magnetic field produced by the power transmission unit 102 responsive to receiving a signal indicative of a human presence proximate the power receiving unit 104.

The analog transmission circuit 418 may include any number and/or combination of devices and/or systems that monitor and or control the flow of energy to the power receiving unit 104. Such devices and/or systems may include, but are not limited to, one or more power amplifiers, one or more impedance matching networks, one or more reflected power sensing systems, or combinations thereof. The analog transmission circuit 418 controls the current flow to the transmission coil 402 in the power transmission unit 102.

The power receiving unit 104 may include one or more receiving coils 404. The variable magnetic field 108 produced by the power transmission unit 102 may induce an alternating current in the one or more receiving coils 404. The alternating current generated in the receiving coil 404 may be used to power an electric vehicle and/or to recharge a secondary storage battery 160 carried by an electric vehicle. In embodiments, the power receiving unit 104 may include one or more rectifiers 430 to convert at least a portion of the alternating current provided by the one or more receiving coils to a direct current which is useful for recharging secondary batteries 160 powering an electric vehicle. In embodiments, the power receiving unit 104 may include one or more voltage regulators 432, 436 suitable for maintaining the received, rectified current at a level useful to the electric vehicle carrying the power receiving unit 104. The power receiving unit 104 may also include one or more power controllers 434 to adjust or control the flow of energy into the secondary storage battery 160.

As depicted in FIG. 4, the actuation sub-system 140 may operably couple 142B to the power transmission unit 102. The actuation sub-system 140 may operably couple 142A to the power receiving unit 104. In embodiments, the actuation sub-system 140 may operably couple to both the power transmission unit 102 and the power receiving unit 104. In embodiments, the inductive power transfer control circuit 132 may cause the actuation sub-system 140 to adjust and maintain the distance between the power transmission unit 102 and the power receiving unit 104. In embodiments, the inductive power transfer control circuit 132 may cause the actuation sub-system 140 to adjust and maintain the alignment of the power transmission unit 102 and the power receiving unit 104. In embodiments, the inductive power transfer control circuit 132 may cause the actuation sub-system 140 to adjust and maintain the distance and the alignment of the power transmission unit 102 and the power receiving unit 104.

Figure 5B:
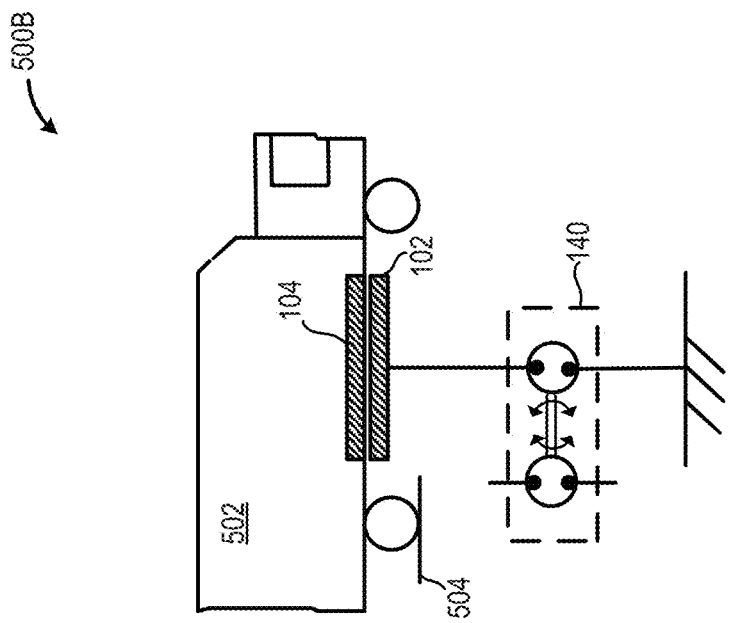
FIG. 5B is a schematic diagram of the illustrative inductive power transfer system depicted in FIG. 5A in which an actuation sub-system operably couples to a power transmission unit and the power transmission unit is depicted in a raised/operating state proximate a power receiving unit coupled to a vehicle chassis, in accordance with at least one embodiment of the present disclosure.
Figure 5A:
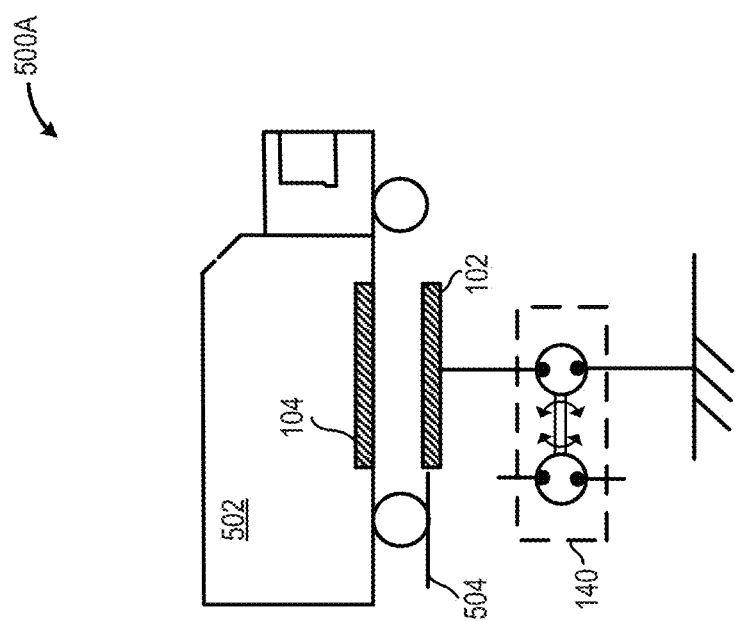
FIG. 5A is a schematic diagram of an illustrative inductive power transfer system in which an actuation sub-system operably couples to a power transmission unit and the power transmission unit is depicted in a lowered state flush with a vehicle accessible surface, in accordance with at least one embodiment of the present disclosure.

FIGS. 5A and 5B depict an illustrative inductive power transfer system in which an actuation sub-system 140 operably couples to a power transmission unit 102 and is used to transition the power transmission unit 102 from a lowered state in 500A to a raised state in 500B in which the actuation sub-system 140 has positioned the power transmission unit 102 proximate a power receiving unit 104 carried by a motor vehicle 502, in accordance with at least one embodiment of the present disclosure.

FIG. 5A depicts the power transmission unit 102 disposed remote from the vehicle-mounted power receiving unit 104. In some implementations the power transmission unit 102 may be disposed flush or nearly flush with a vehicle accessible surface 504 such as a roadway, a driveway, or a garage floor.

FIG. 5B depicts the power transmission unit 102 disposed proximate the vehicle-mounted power receiving unit 104. An inductive power transfer control circuit 132 (not shown in FIGS. 5A or 5B) may cause the actuation sub-system 140 to displace, move, or otherwise transition from the lowered position depicted in FIG. 5A to a position a defined distance from the power receiving unit 104. The inductive power transfer control circuit 132 may additionally cause the actuation sub-system to align the power transmission unit 102 with the power receiving unit 104. When proximate the power receiving unit 104, the power transmission unit 102 may extend from the vehicle accessible surface 504 a distance sufficient to prevent the movement of the motor vehicle 502.

Figure 6B:
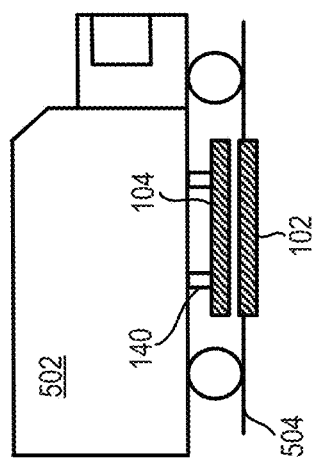
FIG. 6B is a schematic diagram of the illustrative inductive power transfer system depicted in FIG. 6A in which the actuation sub-system has lowered the power receiving unit proximate a power transmission unit disposed in, on, or about a vehicle accessible surface beneath the vehicle, in accordance with at least one embodiment of the present disclosure.
Figure 6A:
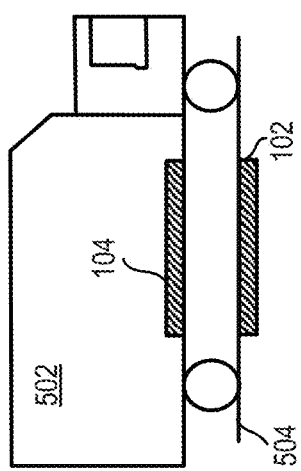
FIG. 6A is a schematic diagram of an illustrative inductive power transfer system in which an actuation sub-system operably couples to a power receiving unit mounted on the chassis of a motor vehicle and the power receiving unit is depicted raised, proximate the chassis of the vehicle, in accordance with at least one embodiment of the present disclosure.

FIGS. 6A and 6B depict an illustrative inductive power transfer system in which an actuation sub-system 140 operably couples to a power receiving unit 104 mounted on the chassis of a motor vehicle 502 and is used to transition the power receiving unit 104 from a raised state 600A to a lowered state 600B in which the power receiving unit 104 extends from the chassis of the motor vehicle 502 to a position proximate a power transmission unit 102 disposed in the vehicle accessible surface 504 beneath the motor vehicle 502, in accordance with at least one embodiment of the present disclosure.

FIG. 6A depicts the power receiving unit 104 disposed remote from the power transmission unit 102 disposed in the vehicle accessible surface 504. In some implementations the power receiving unit 104 may be disposed flush or nearly flush with a chassis of the motor vehicle 502. The power transmission unit 102 may be disposed at least partially in the vehicle accessible surface 504. The vehicle accessible surface 504 may include, but is not limited to, a roadway, a driveway, or a garage floor.

FIG. 6B depicts the vehicle-mounted power receiving unit 104 disposed proximate the power transmission unit 102 disposed in the vehicle accessible surface 504. An inductive power transfer control circuit 132 (not shown in FIGS. 6A or 6B) may cause the actuation sub-system 140 to displace, move, or otherwise transition the power receiving unit 104 from the raised position proximate the vehicle chassis depicted in FIG. 6A to a position a defined distance from the power transmission unit 102. The inductive power transfer control circuit 132 may additionally cause the actuation sub-system to align the power receiving unit 104 with the power transmission unit 102.

In embodiments, the vehicle chassis may be displaceable in a vertical direction. Such adjustable chassis systems may include, but are not limited to, systems that include "air ride" or "height adjustable" components. In some implementations, the inductive power transfer control circuit 132 may generate a signal that is communicated to the suspension ride height controller carried by the vehicle 502. The signal provided by the inductive power transfer control circuit 132 may cause the suspension ride height controller in the vehicle 502 to lower the chassis of the vehicle, thereby assisting in placing the power receiving unit 104 proximate the power transmission unit 102 disposed in the vehicle accessible surface 504 beneath the vehicle 502.

Figure 7:
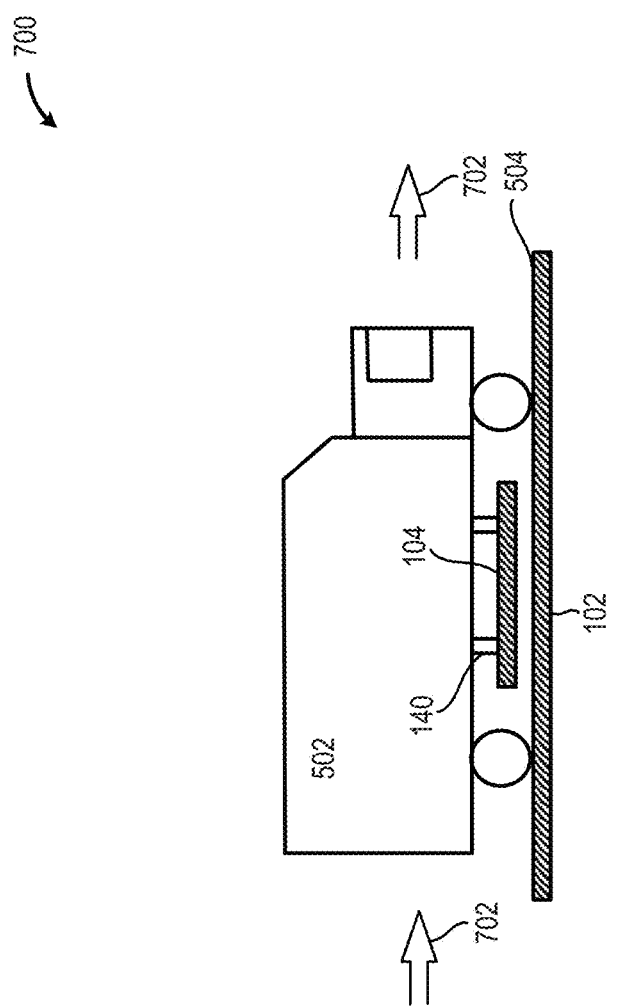
FIG. 7 is a schematic diagram depicting an illustrative inductive power transfer system in which an actuation sub-system operably couples to a power receiving unit mounted on a chassis of a motor vehicle and is used to transition the power receiving unit from a raised state to a lowered state in which the power receiving unit extends from the chassis of the motor vehicle to a position proximate a power transmission unit disposed in the vehicle accessible surface 504 beneath the motor vehicle and across which the motor vehicle is traveling, in accordance with at least one embodiment of the present disclosure.

FIG. 7 is a schematic diagram depicting an illustrative inductive power transfer system 700 in which an actuation sub-system 140 operably couples to a power receiving unit 104 mounted on a chassis of a motor vehicle 502 and is used to transition the power receiving unit 104 from a raised state to a lowered state in which the power receiving unit 104 extends from the chassis of the motor vehicle 502 to a position proximate a power transmission unit 102 disposed in the vehicle accessible surface 504 beneath the motor vehicle 502 and across which the motor vehicle 502 is traveling 702, in accordance with at least one embodiment of the present disclosure.

In some implementations, the power transmission unit 102 may be disposed along a vehicle accessible surface 504 such as a roadway or similar structure along which the motor vehicle 502 travels 702. In such an arrangement, the power receiving unit 104 receives energy from the power transmission unit 102 as the motor vehicle 502 travels along the vehicle accessible surface 504. In embodiments, such an arrangement may permit an electrically powered vehicle to operate using only the energy received from the power transmission unit 102. In embodiments, such an arrangement may reduce the current draw on the batteries 160 of a battery powered vehicle 502 by providing a portion of the energy used by the vehicle 502 thereby reducing the draw on the batteries 160 carried by the vehicle 502. In embodiments, such an arrangement may provide sufficient energy to permit the operation of the electrically powered vehicle 502 and charge one or more secondary batteries 160 carried by the electrically powered vehicle 502.

Figure 8:
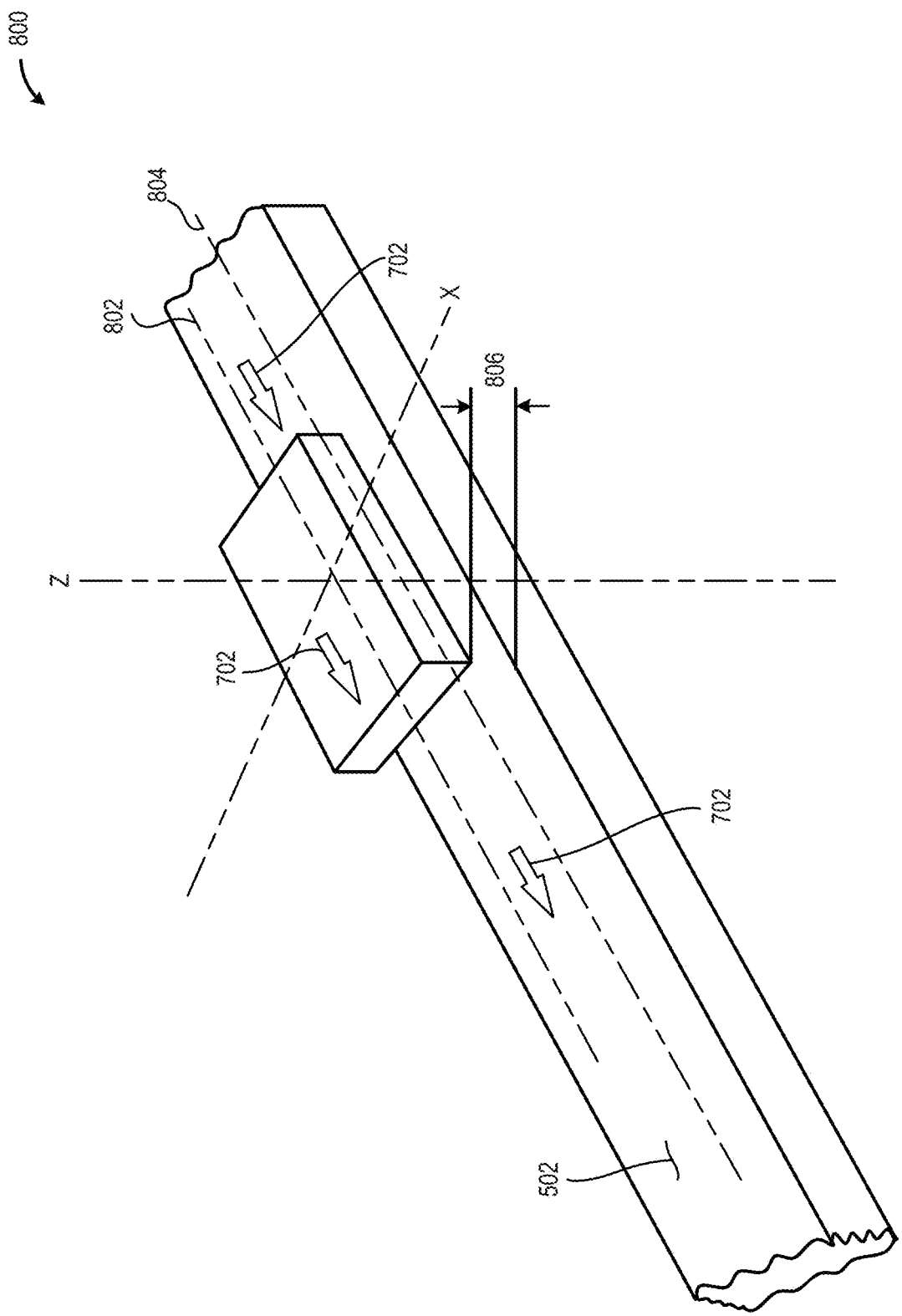
FIG. 8 is a perspective diagram depicting an illustrative inductive power transfer system in which a power receiving unit travels along a vehicle accessible surface in which a number of power transmission units have been embedded, in accordance with at least one embodiment of the present disclosure.

FIG. 8 is a perspective diagram depicting an illustrative inductive power transfer system 800 in which a power receiving unit 104 travels along a vehicle accessible surface 502 in which a number of power transmission units 102 have been embedded, in accordance with at least one embodiment of the present disclosure. In some implementations at least one power transmission unit 102 may be partially or completely embedded in, on, or about a vehicle accessible surface 502 such as a lane on a roadway, a track, or similar surface. Such an arrangement may include a single power transmission unit 102, multiple adjacent power transmission units 102, or a series of spaced power transmission units 102 partially or completely embedded in, on, or about the vehicle accessible surface 502. Such an arrangement, when used with vehicles 502 equipped with secondary storage batteries 160 makes possible the implementation of a smart infrastructure where power transmission units 102 embedded in major roadways enable travel over long distances and secondary batteries permit operation of the vehicle 502 on secondary roadways that lack the power transmission unit 102 infrastructure.

As depicted in FIG. 8, the direction of travel 702 of the power receiving unit 104 extends along an axis 802 that is generally parallel to the longitudinal axis 804 of the power transmission unit 102. The actuation sub-system 140 maintains a constant or near constant distance 806 between the moving power receiving unit 104 and the stationary power transmission unit 102. In some implementations, the inductive power transfer inductive power transfer control circuit 132 may continuously monitor, adjust, and/or control the actuation sub-system 140 to maintain the distance 806 between the power receiving unit 104 and the power transmission unit 102 as the power receiving unit 104 travels along the power transmission unit 102.

Figure 9:
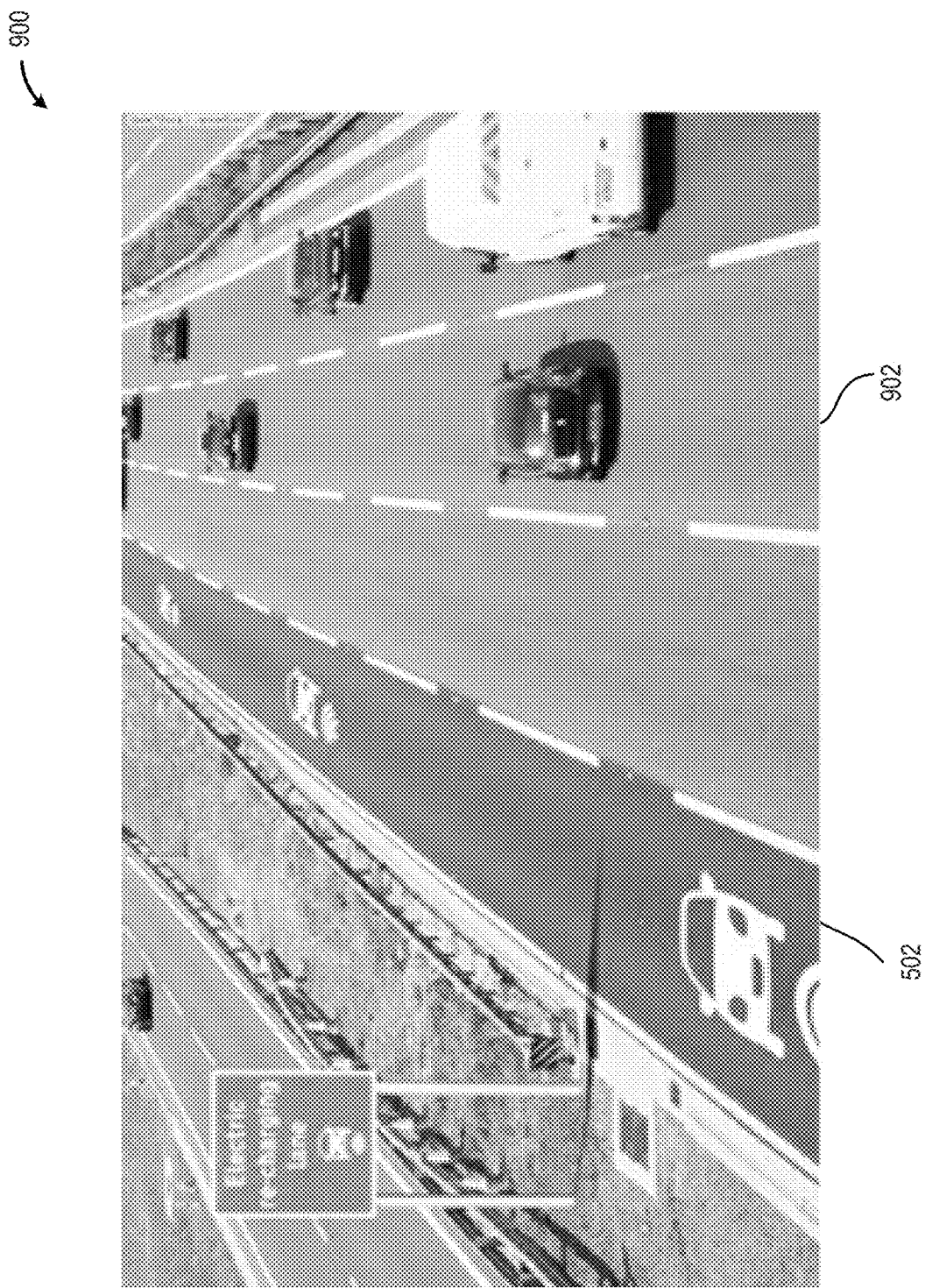
FIG. 9 is a photograph of an illustrative inductive power transfer system in which a lane in a multi-lane roadway includes a number of power transmission units which have been embedded in the surface of a dedicated power transfer/charging lane, in accordance with at least one embodiment of the present disclosure.

FIG. 9 is a photograph of an illustrative inductive power transfer system 900 in which a lane in a multi-lane roadway includes a number of power transmission units 102 which have been embedded in the surface 502 of a dedicated power transfer/charging lane, in accordance with at least one embodiment of the present disclosure. In some implementations, the power transmission units 102 may be embedded continuously, intermittently at regular intervals, or at various intervals along a travel lane of a roadway 902.

In such implementations, vehicles 502 having a power receiving unit 104 may travel in the dedicated lane and the power transmission unit 102 will transfer energy to the power receiving unit 104. In some implementations, an inductive power transfer control circuit 132 in the vehicle 502 may cause an actuation sub-system 140 carried by the vehicle 502 to continuously alter or adjust to maintain a desired distance between the power transmission unit 102 and the power receiving unit 104. In such implementations, one or more sideband communication channels may be used to track the energy usage of individual vehicles 502 for accounting and billing.

In some implementations, the inductive power transfer control circuit 132 carried by a vehicle 502 traveling 702 along the vehicle accessible surface 504 may communicate with the power transmission unit 102 embedded in the roadway surface. Such communications may include, for example, data or information representative of the rate at which energy is received by the power receiving unit 104 carried by the vehicle 502 as the vehicle 502 travels along the vehicle accessible surface 504. Such communications may include, for example, data or information representative of the measured electromagnetic fields within the vehicle 502 as the vehicle travels along the vehicle accessible surface 504. In response to receiving the communication that includes information or data indicative of the electromagnetic fields within the vehicle 502, the power transmission unit control circuit 152 may adjust the power flow to the power transmission unit 102 to maintain the measured electromagnetic fields within the vehicle 502 at acceptable levels or at levels compliant with regulatory recommendations and/or guidelines.

Figure 10:
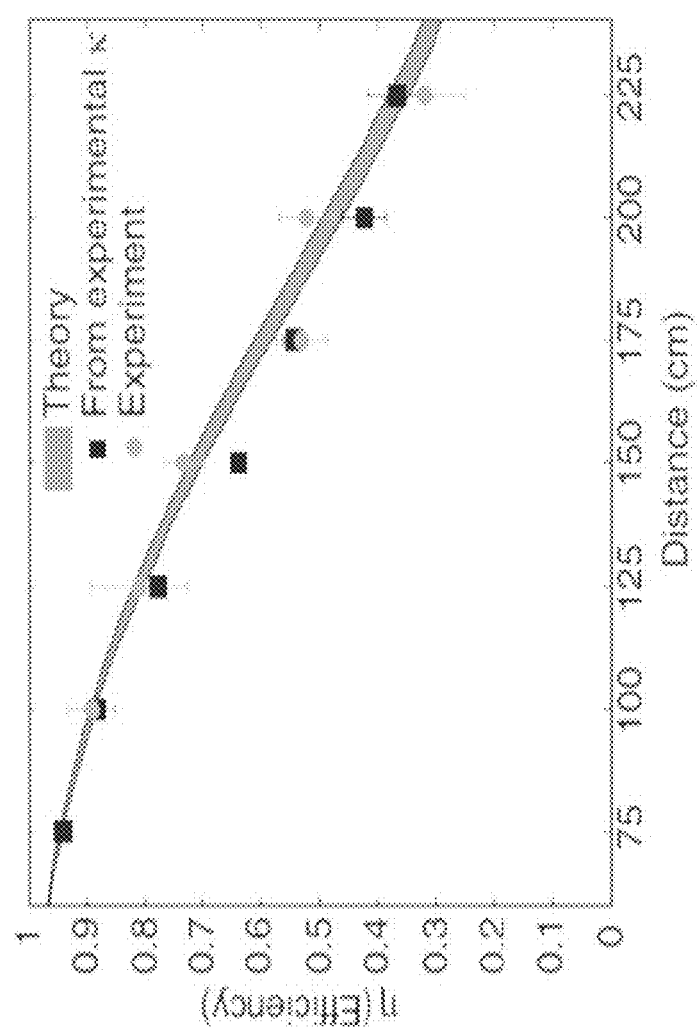
FIG. 10 is a graph depicting an example power transfer efficiency as a function of distance separating the power transmission unit and the power receiving unit, in accordance with at least one embodiment of the present disclosure.

FIG. 10 is a graph depicting an example power transfer efficiency as a function of distance separating the power transmission unit 102 and the power receiving unit 104, in accordance with at least one embodiment of the present disclosure. As evidenced in FIG. 10, efficiency at 75 centimeters (cm) separation between the power transmission unit 102 and the power receiving unit 104 is approximately 95%. In contrast, efficiency at 225 cm separation between the power transmission unit 102 and the power receiving unit 104 is approximately 35%.

Figure 11:
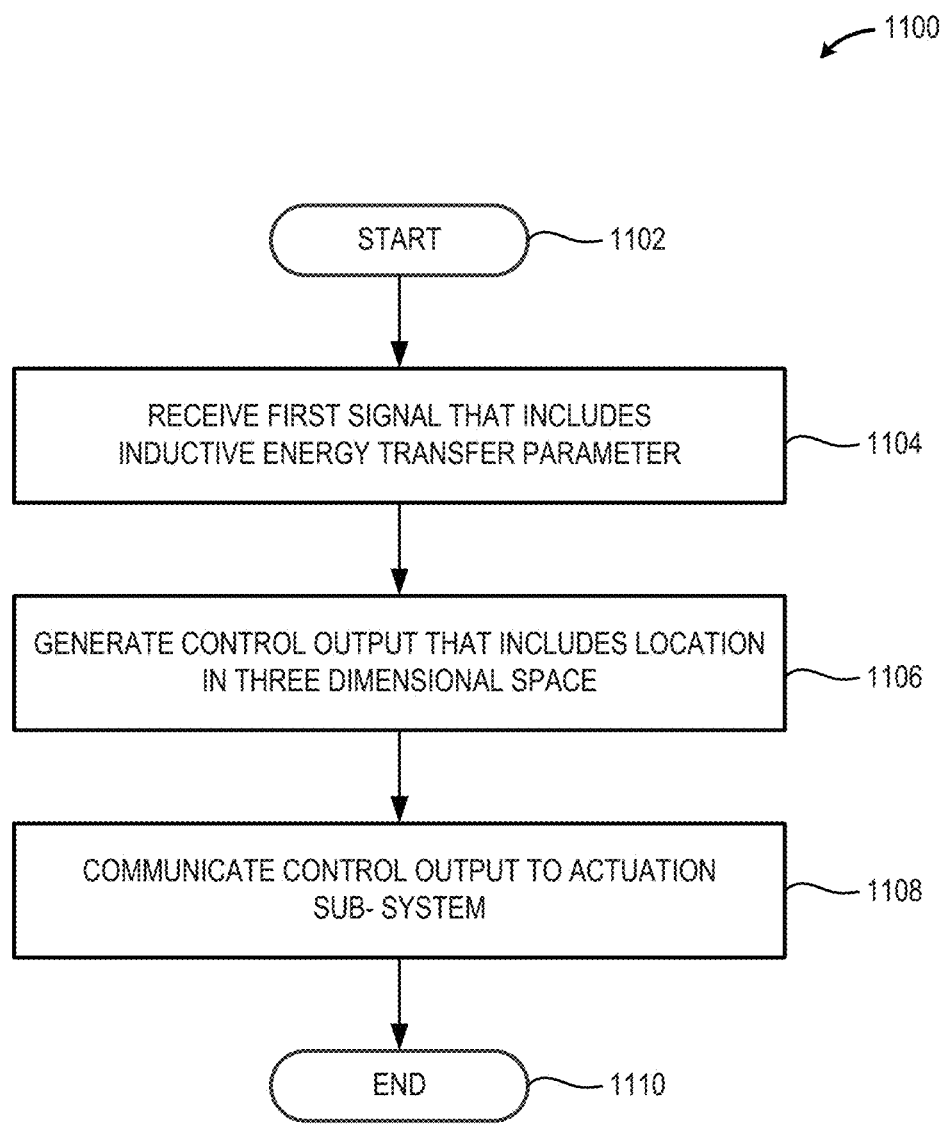
FIG. 11 is a high level flow diagram of an illustrative inductive power transfer method in which an actuation sub-system positions at least one of: a power transmission unit or a power receiving unit in a three-dimensional space based on at least one inductive energy transfer parameter, in accordance with at least one embodiment of the present disclosure.

FIG. 11 is a high level flow diagram of an illustrative inductive power transfer method 1100 in which an actuation sub-system 140 positions at least one of: a power transmission unit 102 or a power receiving unit 104 in a three-dimensional space based on at least one inductive energy transfer parameter, in accordance with at least one embodiment of the present disclosure. In embodiments, an inductive power transfer control circuit 132 may position the power transmission unit 102 or the power receiving unit 104 such that the spacing between the power transmission unit 102 and the power receiving unit 104 is maintained at a defined distance. The defined distance may be selected to maximize the energy transfer rate and/or efficiency between the power transmission unit 102 and the power receiving unit 104. The method commences at 1102.

At 1104, the inductive power transfer control circuit 132 receives a first signal that includes information and/or data representative of at least one inductive energy transfer parameter. In embodiments, the at least one energy transfer parameter may include one or more parameters corresponding to or indicative of the energy transferred from the power transmission unit 102 to the power receiving unit 104, such as power transmission unit 102 temperature, magnetic field intensity, current, and/or voltage, power receiving unit 104 temperature, magnetic field intensity, current, and/or voltage.

At 1106, the inductive power transfer control circuit 132 generates a control output that includes information and/or data indicative of a location within a three-dimensional space to position at least one of: the power transmission unit 102 and/or the power receiving unit 104. In some instances, the power transmission unit 102 and the power receiving unit 104 may be stationary with respect to each other and the location in three-dimensional space may be a fixed location. In such instances, the inductive power transfer control circuit 132 may transmit or communicate only a single location within the three-dimensional space to position at least one of: the power transmission unit 102 or the power receiving unit 104.

In some instances, the power transmission unit 102 and/or the power receiving unit 104 may be moving with respect to each other and the location in the three-dimensional space may be variable. In such instances, the inductive power transfer control circuit 132 may continuously, periodically, or intermittently transmit or communicate the information and/or data indicative of the location in the three-dimensional space to position at least one of: the power transmission unit 102 or the power receiving unit 104.

At 1108, the inductive power transfer control circuit 132 transmits or communicates the control output to an actuation sub-system 140 that is operably coupled to at least one of: the power transmission unit 102 and/or power receiving unit 104. The actuation sub-system 140 positions the power transmission unit 102 and/or the power receiving unit 104 at the defined location within the three-dimensional space. The method 1100 concludes at 1110.

Figure 12:
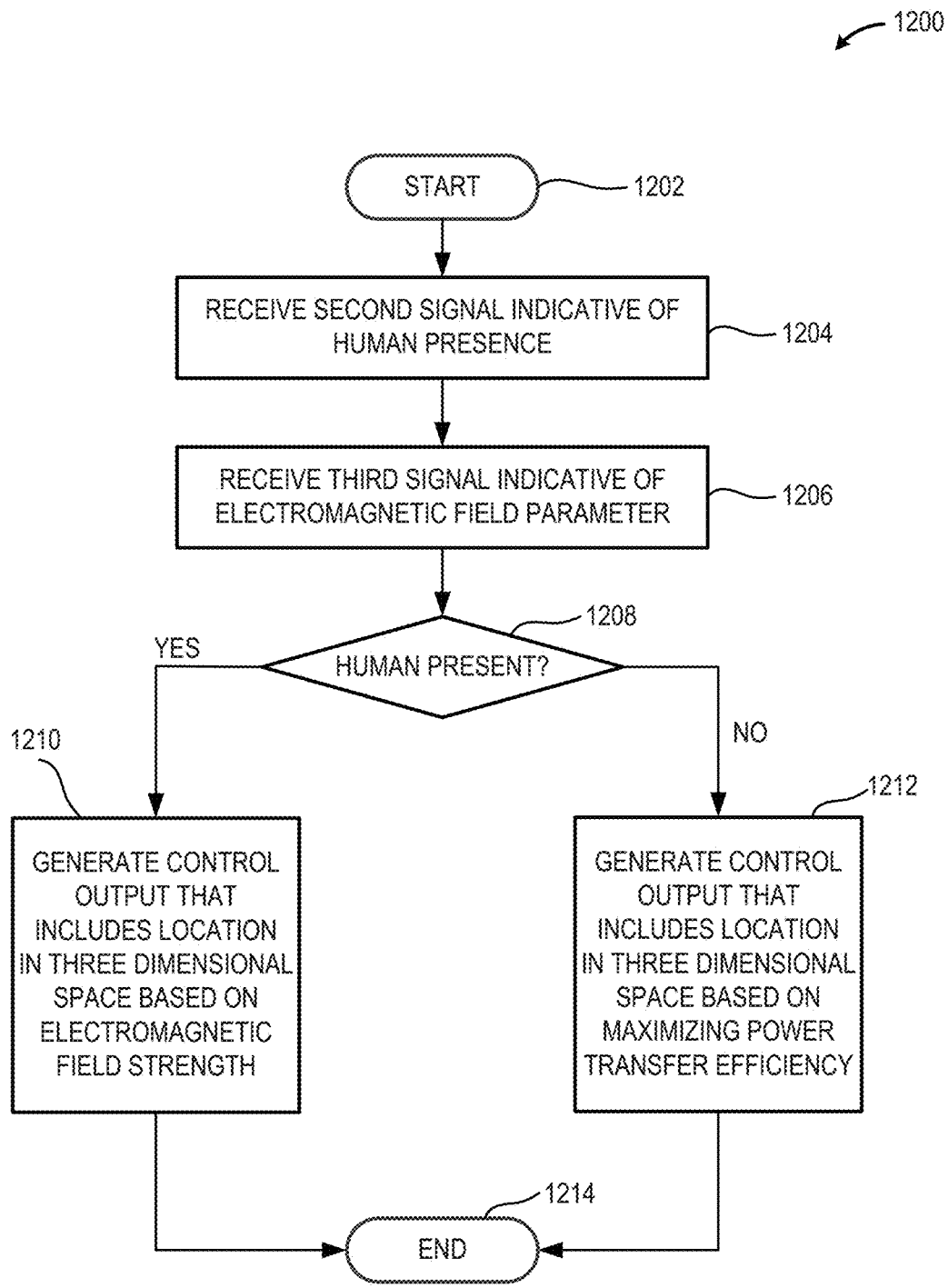
FIG. 12 is a high level flow diagram of an illustrative inductive power transfer method in which an actuation sub-system positions at least one of: a power transmission unit or a power receiving unit in a three-dimensional space based on at least one inductive energy transfer parameter, in accordance with at least one embodiment of the present disclosure.

FIG. 12 is a high level flow diagram of an illustrative inductive power transfer method 1200 in which an actuation sub-system 140 positions at least one of: a power transmission unit 102 or a power receiving unit 104 in a three-dimensional space based on at least one inductive energy transfer parameter, in accordance with at least one embodiment of the present disclosure. In embodiments, an inductive power transfer control circuit 132 may position the power transmission unit 102 or the power receiving unit 104 such that the spacing between the power transmission unit 102 and the power receiving unit 104 is maintained at a defined distance. The defined distance may be selected to maximize the energy transfer rate and/or efficiency between the power transmission unit 102 and the power receiving unit 104. The defined distance may be selected to maintain human exposure to electromagnetic radiation at or below a threshold value which may be based on life safety or regulatory requirements. The method commences at 1202.

At 1204, the inductive power transfer control circuit 132 receives a second signal that includes information and/or data indicative of a human presence. In some implementations, the second signal may include information and/or data indicative of a human presence proximate the power transmission unit 102 and/or the power receiving unit 104. In some implementations, the second signal may include information and/or data indicative of a human presence in a vehicle 502 carrying a power receiving unit 104.

In some implementations, the second signal may include information and/or data generated using one or more sensors capable of directly or indirectly detecting a human presence. For example, one or more proximity sensors may provide the second signal when a human presence is detected proximate the sensor. In another example, one or more pressure or strain gauges may be used to detect the presence of a standing or seated human. In another example, one or more optical sensors may be used to detect a human presence. In another example, one or more thermal sensors may be used to detect a human presence.

At 1206, the inductive power transfer control circuit 132 receives a third signal that includes information and/or data indicative of an electromagnetic field generated by the inductive power transfer system 100. In some implementations, the third signal may include information and/or data indicative of an electromagnetic field existent in proximity to the detected human presence. For example, if a human presence is detected in a vehicle 502 containing a power receiving unit 104, the third signal may include information and/or data indicative of the electromagnetic fields existent within the vehicle 502.

At 1208, the inductive power transfer control circuit 132 determines whether a human presence has been detected. If a human presence has been detected based on the information and/or data included in the second signal, the method 1200 continues at 1210. If no human presence has been detected based on the information and/or data included in the second signal, the method 1200 continues at 1212.

At 1210, responsive to detecting a human presence at 1208, the inductive power transfer control circuit 132 generates a control output that includes information and/or data that includes a location in a three dimensional space to position at least one of: the power transmission unit 102 or the power transmission unit 102. The inductive power transfer control circuit 132 may determine the location in three-dimensional space to locate at least one of: the power transmission unit 102 or the power receiving unit 104 based on the information and/or data indicative of the electromagnetic field strength included in the third signal. For example, the inductive power transfer control circuit 132 may determine a location in the three-dimensional space that limits the exposure of the detected humans to a permissible level. In another example, the inductive power transfer control circuit 132 may limit the energy transfer rate in the inductive power transfer system 100 to a level at which the exposure of the detected humans to the electromagnetic field is maintained at a desired level.

At 1212, responsive to not detecting a human presence at 1208, the inductive power transfer control circuit 132 generates a control output that includes information and/or data that includes a location in a three dimensional space to position at least one of: the power transmission unit 102 or the power transmission unit 102. The inductive power transfer control circuit 132 may determine the location in three-dimensional space to locate at least one of: the power transmission unit 102 or the power receiving unit 104 based on maximizing the energy transfer rate achieved by the inductive power transfer system 100. The method 1200 concludes at 1214.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, coils, transmission lines, slow-wave transmission lines, transformers, and so forth), integrated circuits, application specific integrated circuits (ASIC), wireless receivers, transmitters, transceivers, smart antenna arrays for beamforming and electronic beam steering used for wireless broadband communication or radar sensors for autonomous driving or as gesture sensors replacing a keyboard device for tactile internet experience, screening sensors for security applications, medical sensors (cancer screening), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The following examples pertain to further embodiments. The following examples of the present disclosure may comprise subject material such devices, systems, methods, and means for inductively transferring power between a power transmission unit 102 and a power receiving unit 104 where at least one of the power transmission unit 102 or the power receiving unit 104 are operably coupled to an actuation sub-system 140 that positions at least one of the power transmission unit 102 or the power receiving unit 104 at a defined location in three-dimensional space. The defined location may include a location that maximizes the inductive power transfer from the power transmission unit 102 to the power receiving unit 104. The defined location may include a location in three-dimensional space that limits the exposure of humans to electromagnetic fields at or above one or more defined thresholds. The systems and methods described herein provide for inductive power transfer from a stationary power transmission unit 102 disposed in a vehicle accessible surface 504 to a vehicle 502 carrying a power receiving unit 104 and traveling along the vehicle accessible surface 504.

According to example 1, there is provided an inductive energy transfer system. The system may include a power transfer sub-system that includes one of: a power transmission unit that includes at least one power transmission coil coupleable to a power supply; or, a power receiving unit that includes at least one power receiving coil coupleable to a load; an actuation sub-system operably coupled to the power transfer-subsystem, the actuation sub-system to move the power transfer sub-system in three dimensional (3D) space; at least one sensor to provide at least one signal that includes data indicative of at least one inductive energy transfer parameter; control circuitry communicably coupled to the actuation sub-system and to the at least one sensor; a storage device containing machine-readable instructions communicably coupled to the control circuitry, the machine-readable instructions, when executed by the control circuitry, transform at least a portion of the control circuitry to a dedicated power transfer control circuit, the power transfer control circuit to: cause the actuation sub-system to physically position the power transfer sub-system in the 3D space at a location that optimizes the at least one inductive energy transfer parameter.

Example 2 may include elements of example 1 where the power transmission unit may further include a first transceiver; where the power receiving unit may further include a second transceiver, the second transceiver communicably coupled to the first transceiver; and where the first transceiver and the second transceiver bidirectionally exchange information representative of the inductive energy transfer between the power transmission unit and the power receiving unit.

Example 3 may include elements of example 1 where the at least one inductive energy transfer parameter includes a parameter indicative of a power transfer between the power transmission unit and the power receiving unit; and where the actuation sub-system physically positions the power transmission unit to maximize the power transfer between the power transmission unit and the power receiving unit for any fixed separation distance between the power transmission unit and the power receiving unit.

Example 4 may include elements of example 1 where the load may include an energy storage device conductively coupleable to an electric motor operably coupled to a motor-driven vehicle.

Example 5 may include elements of example 1 where the at least one sensor may generate an output signal that includes data representative of a power transfer rate.

Example 6 may include elements of example 1 where the at least one sensor may generate an output signal that includes data representative of a magnetic field proximate the power transfer sub-system.

Example 7 may include elements of example 6, and may additionally include a second sensor to detect human presence proximate the power transfer sub-system, where the power transfer control circuit may limit the magnetic field proximate the power transfer sub-system to a first value responsive to the second sensor detecting a human presence proximate the power transfer sub-system; and where the power transfer control circuit may limit the magnetic field proximate the power transfer sub-system to a second value responsive to the second sensor detecting an absence of human presence proximate the power transfer sub-system.

Example 8 may include elements of any of examples 1 through 7 where the power transmission unit may include a stationary power transmission unit; and where the power receiving unit may include a power receiving unit displaceable with respect to the stationary power transmission unit.

Example 9 may include elements of example 8 where the power receiving unit may include a power receiving unit operably coupleable to a chassis of a motor vehicle; and where the power transmission unit may include a power transmission unit disposed in a motor vehicle accessible surface.

Example 10 may include elements of example 9 where the motor vehicle accessible surface may include a roadway; and where the inductive energy transfer system may include a system to transfer power from the power transmission unit to the power receiving unit as the motor vehicle travels along the roadway.

Example 11 may include elements of example 9 where the inductive energy transfer system may include a system to transfer power from the power transmission unit to the power receiving as the motor vehicle remains stationary with respect to the motor vehicle accessible surface.

Example 12 may include elements of example 9 where the chassis of the motor vehicle may include a chassis adjustable in at least one dimension; and where the machine-readable instructions that cause power transfer control circuit to cause the actuation sub-system to physically position the power transfer sub-system in the 3D space at a location that optimizes the at least one inductive energy transfer parameter, may further cause the power transfer control circuit to further: adjust the chassis of the motor vehicle in the at least one dimension to optimize the at least one inductive energy transfer parameter.

Example 13 may include elements of example 9, and may additionally include a vehicle operator feedback sub-system that may include a human perceptible output device and feedback control circuitry communicably coupled to the power transfer control circuit, the feedback control circuitry to: receive a feedback signal from the power transfer control circuit, the feedback signal including information indicative of at least one vehicle position correction to adjust the chassis of the motor vehicle in the at least one dimension to optimize the at least one inductive energy transfer parameter; and generate a feedback output that includes human perceptible instructions on a control input to achieve the at least one vehicle position correction.

Example 14 may include elements of example 9, and may additionally include an autonomous vehicle feedback sub-system that may include feedback control circuitry communicably coupled to the power transfer control circuit and at least one vehicular directional control sub-system, the feedback control circuitry to: receive a feedback signal from the power transfer control circuit, the feedback signal including information indicative of at least one vehicle position correction to adjust the chassis of the motor vehicle in the at least one dimension to optimize the at least one inductive energy transfer parameter; generate a vehicle positional control output to achieve the at least one vehicle position correction; and communicate the vehicle positional control output to the at least one vehicular directional control sub-system.

Example 15 may include elements of any of examples 1 through 7, where the power receiving unit may include a stationary power receiving unit; and where the power transmission unit may include a power transmission unit displaceable with respect to the stationary power receiving unit.

Example 16 may include elements of example 15 where the power receiving unit may include a stationary power receiving unit operably couple-able to a chassis of a motor vehicle; and where the power transmission unit may include a power transmission unit disposed in a motor vehicle accessible surface.

Example 17 may include elements of example 16 where the inductive energy transfer system may include a system to transfer power from the power transmission unit to the power receiving as the motor vehicle remains stationary with respect to the motor vehicle accessible surface.

According to example 18, there is provided a controller. The controller may include a control interface to provide at least one output to an actuation sub-system, the actuation subsystem to control, in a three-dimensional (3D) space, the position of at least one of: an inductive power transmission unit; or, an inductive power receiving unit; a sensor interface to receive a first signal that includes information indicative of at least one inductive energy transfer parameter, the inductive energy transfer parameter indicative of an inductive energy transfer between the inductive power transmission unit and the inductive power receiving unit; controller circuitry communicably coupled to the control interface and to the sensor interface; a storage device communicably coupled to the controller circuitry, the storage device including machine-readable instructions that physically transform the controller circuitry to a dedicated power transfer control circuit, the power transfer control circuit to: cause the actuation sub-system to physically position at least one of: the inductive power transmission unit; or, the inductive power receiving unit in the 3D space at a physical location that optimizes the at least one inductive energy transfer parameter.

Example 19 may include elements of example 18 where the sensor interface may further receive a second signal that includes information indicative of a human presence proximate at least one of: the inductive power transmission unit; or, the inductive power receiving unit.

Example 20 may include elements of example 18 where the first signal may include data representative of a magnetic field proximate at least one of: the inductive power transmission unit; or, the inductive power receiving unit.

Example 21 may include elements of example 20 where the machine-readable instructions may further cause the power transfer control circuit to: cause the actuation sub-system to physically position at least one of: the inductive power transmission unit; or, the inductive power receiving unit in the 3D space at a physical location that limits the magnetic field proximate at least one of: the inductive power transmission unit; or, the inductive power receiving unit to a first threshold value responsive to a receipt of the second signal that includes information indicative of a human presence.

Example 22 may include elements of example 20 where the machine-readable instructions may further cause the power transfer control circuit to: cause the actuation sub-system to physically position at least one of: the inductive power transmission unit; or, the inductive power receiving unit in the 3D space at a physical location that optimizes the at least one inductive energy transfer parameter responsive to a receipt of the second signal that includes information indicative of no human presence proximate at least one of: the inductive power transmission unit; or, the inductive power receiving unit.

Example 23 may include elements of any of examples 18 through 22 where the control interface to provide at least one output to an actuation sub-system, the actuation subsystem to control, in a three-dimensional (3D) space, the position of at least one of: an inductive power transmission unit; or an inductive power receiving unit comprises: a control interface to provide at least one output to the actuation sub-system, the actuation sub-system to control, in a three-dimensional (3D) space, the position of an inductive power receiving unit coupleable to a chassis of a motor vehicle with respect to an inductive power transmission unit disposed in a motor vehicle accessible surface.

Example 24 may include elements of example 23 where the control interface to provide at least one output to the actuation sub-system, the actuation sub-system to control, in a three-dimensional (3D) space, the position of an inductive power receiving unit coupleable to a chassis of a motor vehicle may further comprise: a control interface to provide at least one output to the actuation sub-system, the actuation sub-system to control inductive power transfer from an inductive power transmission unit disposed in a roadway surface to the inductive power receiving unit as the motor vehicle travels along the roadway surface.

Example 25 may include elements of example 23 where the control interface to provide at least one output to the actuation sub-system, the actuation sub-system to control, in a three-dimensional (3D) space, the position of an inductive power receiving unit coupleable to a chassis of a motor vehicle may further include a control interface to provide at least one output to the actuation sub-system, the actuation sub-system to control inductive power transfer from power transmission unit disposed in a motor vehicle accessible surface to the power receiving as the motor vehicle remains stationary with respect to the motor vehicle accessible surface.

Example 26 may include elements of example 23 where the control interface to provide at least one output to the actuation sub-system, the actuation sub-system to control, in a three-dimensional (3D) space, the position of an inductive power receiving unit coupleable to a chassis of a motor vehicle may further include a control interface to provide a third output to an adjustable motor vehicle chassis adjustable in at least one dimension, the third output to optimize the at least one inductive energy transfer parameter.

Example 27 may include elements of example 24 where the control interface may further include an interface to: receive a signal that includes information indicative of a physical position of the motor vehicle with respect to the roadway surface; and provide a feedback signal to a motor vehicle feedback sub-system; where the control interface to provide at least one output to the actuation sub-system, the actuation sub-system to control, in a three-dimensional (3D) space, the position of an inductive power receiving unit coupleable to a chassis of a motor vehicle further comprises: a control interface to provide a feedback output to the motor vehicle feedback sub-system, the feedback output including information representative of human perceptible instructions to achieve a motor vehicle position correction with respect to the roadway surface.

Example 28 may include elements of example 24 and the control interface may further: receive a signal that includes information indicative of a physical position of the motor vehicle with respect to the roadway surface; and provide a feedback signal to a motor vehicle feedback sub-system; where the control interface to provide at least one output to the actuation sub-system, the actuation sub-system to control, in a three-dimensional (3D) space, the position of an inductive power receiving unit coupleable to a chassis of a motor vehicle further comprises: a control interface to autonomously communicate a feedback output to the motor vehicle feedback sub-system, the feedback output including information to autonomously position the motor vehicle with respect to the roadway surface.

Example 29 may include elements of any of examples 18 through 22 where the control interface to provide at least one output to an actuation sub-system, the actuation subsystem to control, in a three-dimensional (3D) space, the position of at least one of: an inductive power transmission unit; or an inductive power receiving unit may include a control interface to provide at least one output to the actuation sub-system, the actuation sub-system to control, in a three-dimensional (3D) space, the position of an inductive power transmission unit disposed in a motor vehicle accessible surface with respect to an inductive power receiver unit coupleable to a chassis of a motor vehicle.

According to example 30, there is provided an inductive power transfer method. The method may include receiving, at a power transfer control circuit interface, a first signal that includes information indicative of at least one inductive energy transfer parameter between an inductive power transmission unit and an inductive power receiving unit; generating, by the power transfer control circuit, at least one control output, the control output including data indicative of a position in a three-dimensional (3D) space of at least one of: an inductive power transmission unit; or, an inductive power receiving unit, the position in the 3D space optimizing an inductive energy transfer between the inductive power transmission unit and the inductive power receiving unit based on the at least one inductive energy transfer parameter; and communicating the at least one control output to a communicably coupled actuation sub-system, the actuation sub-system operably coupled to at least one of: the inductive power transmission unit; or, the inductive power receiving unit.

Example 31 may include elements of example 30 where receiving a first signal that includes information indicative of at least one inductive energy transfer parameter may include receiving, at the power transfer control circuit interface, a first signal that includes information indicative of a power transfer rate between the inductive power transmission unit and the inductive power receiving unit.

Example 32 may include elements of example 30, and may additionally include receiving, at the power transfer control circuit interface, a second signal that includes information indicative of a human presence proximate at least one of: the inductive power transmission unit; or, the inductive power receiving unit.

Example 33 may include elements of example 32, and may additionally include receiving, at the power transfer control circuit interface, a third signal that includes information indicative of a magnetic field proximate at least one of: the inductive power transmission unit; or, the inductive power receiving unit.

Example 34 may include elements of example 33 where generating the control output may further include generating the at least one control output including data indicative of a position in a three-dimensional (3D) space of at least one of: the inductive power transmission unit; or, the inductive power receiving unit such that the position limits the magnetic field proximate at least one of: the inductive power transmission unit; or, the inductive power receiving unit to a first threshold value responsive to a receipt of the second signal indicative of a human presence.

Example 35 may include elements of example 33 where generating the control output may further include generating, by the power transfer control circuit, the control output including data indicative of a position in a three-dimensional (3D) space of at least one of: the inductive power transmission unit; or, the inductive power receiving unit that optimizes the at least one inductive energy transfer parameter responsive to a receipt of the second signal indicative of no human presence.

Example 36 may include elements of any of examples 30 through 35 where the control output may further include generating, by the power transfer control circuit, the control output including data indicative of a position in a three-dimensional (3D) space of an inductive power receiving unit coupleable to a chassis of a motor vehicle with respect to an inductive power transmission unit disposed in a motor vehicle accessible surface.

Example 37 may include elements of example 36 where generating the control output may include generating, by the power transfer control circuit, at least one control output to control inductive power transfer from an inductive power transmission unit disposed in a roadway surface to the inductive power receiving unit as the motor vehicle travels along the roadway surface.

Example 38 may include elements of example 36 where generating the control output including data indicative of a position in a three-dimensional (3D) space of an inductive power receiving unit coupleable to a chassis of a motor vehicle with respect to an inductive power transmission unit disposed in a motor vehicle accessible surface may include generating, by the power transfer control circuit, at least one output to an actuation sub-system to control inductive power transfer from an inductive power transmission unit disposed in a roadway surface to the inductive power receiving unit as the motor vehicle remains stationary with respect to the motor vehicle accessible surface.

Example 39 may include elements of example 36 where generating the control output may include generating, by the power transfer control circuit, a chassis height signal output to an adjustable motor vehicle chassis adjustable in at least one dimension, the chassis height signal output to maximize the at least one inductive energy transfer parameter.

Example 40 may include elements of example 37, and may additionally include receiving, at the power transfer control circuit interface, a signal that includes information indicative of a physical position of the motor vehicle with respect to the roadway surface; and generating, by the power transfer control circuit, a feedback output signal that includes information representative of human perceptible instructions to achieve a motor vehicle position correction with respect to the roadway surface.

Example 41 may include elements of example 37 and may additionally include receiving, at the power transfer control circuit interface, a signal that includes information indicative of a physical position of the motor vehicle with respect to the roadway surface; and generating, by the power transfer control circuit, a feedback output signal to autonomously communicate a feedback output to the motor vehicle the feedback output including information to autonomously position the motor vehicle with respect to the roadway surface.

Example 42 may include elements of any of examples 30 through 35 where the control output including data indicative of a position in a three-dimensional (3D) space of at least one of: an inductive power transmission unit; or, an inductive power receiving unit further may include generating, by the power transfer control circuit, the control output including data indicative of a position in a three-dimensional (3D) space of an inductive power transmission unit disposed in a motor vehicle accessible surface with respect to an inductive power receiver unit coupleable to a chassis of a motor vehicle.

According to example 43, there is provided an inductive power transfer system. The system may include a means for receiving a first signal that includes information indicative of at least one inductive energy transfer parameter between an inductive power transmission unit and an inductive power receiving unit; a means for generating at least one control output including data indicative of a position in a three-dimensional (3D) space of at least one of: an inductive power transmission unit; or, an inductive power receiving unit, the position in the 3D space optimizing an inductive energy transfer between the inductive power transmission unit and the inductive power receiving unit based on the at least one inductive energy transfer parameter; and a means for communicating the at least one control output to a communicably coupled actuation sub-system, the actuation sub-system operably coupled to at least one of: the inductive power transmission unit; or, the inductive power receiving unit.

Example 44 may include elements of example 43 where the means for receiving a first signal that includes information indicative of at least one inductive energy transfer parameter may include a means for receiving a first signal that includes information indicative of a power transfer rate between the inductive power transmission unit and the inductive power receiving unit.

Example 45 may include elements of example 43, and may additionally include a means for receiving a second signal that includes information indicative of a human presence proximate at least one of: the inductive power transmission unit; or, the inductive power receiving unit.

Example 46 may include elements of example 45, and may additionally include a means for receiving a third signal that includes information indicative of a magnetic field proximate at least one of: the inductive power transmission unit; or, the inductive power receiving unit.

Example 47 may include elements of example 45 where the means for generating the control output including data indicative of a position in a three-dimensional (3D) space of at least one of: an inductive power transmission unit; or, an inductive power receiving unit may further include a means for generating the at least one control output including data indicative of a position in a three-dimensional (3D) space of at least one of: the inductive power transmission unit; or, the inductive power receiving unit that limits the magnetic field proximate at least one of: the inductive power transmission unit; or, the inductive power receiving unit to a first threshold value responsive to a receipt of the second signal that includes information indicative of a human presence.

Example 48 may include elements of example 45 where the means for generating the control output includes: a means for generating the control output including data indicative of a position in a three-dimensional (3D) space of at least one of: the inductive power transmission unit; or, the inductive power receiving unit such that the position optimizes the at least one inductive energy transfer parameter responsive to a receipt of the second signal that includes information indicative of no human presence.

Example 49 may include elements of any of examples 43 through 48 where the means for generating at least one control output may further include a means for generating the control output including data indicative of a position in a three-dimensional (3D) space of an inductive power receiving unit coupleable to a chassis of a motor vehicle with respect to an inductive power transmission unit disposed in a motor vehicle accessible surface.

Example 50 may include elements of example 49 where the means for generating the control output including data indicative of a position in a three-dimensional (3D) space of an inductive power receiving unit coupleable to a chassis of a motor vehicle with respect to an inductive power transmission unit disposed in a motor vehicle accessible surface may include a means for generating at least one output to an actuation sub-system to control inductive power transfer from an inductive power transmission unit disposed in a roadway surface to the inductive power receiving unit as the motor vehicle travels along the roadway surface.

Example 51 may include elements of example 49 where the means for generating the control output may further include a means for generating at least one control output to control inductive power transfer from an inductive power transmission unit disposed in a roadway surface to the inductive power receiving unit as the motor vehicle remains stationary with respect to the motor vehicle accessible surface.

Example 52 may include elements of example 49 where the means for generating the control output may include a means for generating a chassis height signal output to an adjustable motor vehicle chassis adjustable in at least one dimension, the chassis height signal output to optimize the at least one inductive energy transfer parameter.

Example 53 may include elements of example 50, and may additionally include a means for receiving a signal that includes information indicative of a physical position of the motor vehicle with respect to the roadway surface and a means for generating a feedback output signal that includes information representative of human perceptible instructions to achieve a motor vehicle position correction with respect to the roadway surface.

Example 54 may include elements of example 50, and may additionally include a means for receiving a signal that includes information indicative of a physical position of the motor vehicle with respect to the roadway surface; and a means for generating a feedback output signal to autonomously communicate a feedback output to the motor vehicle the feedback output including information to autonomously position the motor vehicle with respect to the roadway surface.

Example 55 may include elements of any of examples 43 through 48 where the means for generating at least one control output may further include a means for generating the control output including data indicative of a position in a three-dimensional (3D) space of an inductive power transmission unit disposed in a motor vehicle accessible surface with respect to an inductive power receiver unit coupleable to a chassis of a motor vehicle.

According to example 56, there is provided a storage device that includes machine-readable instructions that when executed by controller circuitry transform the controller circuitry to an inductive power transfer control circuit, the inductive power transfer control circuit to: receive a first signal that includes information indicative of at least one inductive energy transfer parameter between an inductive power transmission unit and an inductive power receiving unit; generate at least one control output, the control output including data indicative of a position in a three-dimensional (3D) space of at least one of: an inductive power transmission unit; or, an inductive power receiving unit, the position in the 3D space based on an inductive energy transfer between the inductive power transmission unit and the inductive power receiving unit based on the at least one inductive energy transfer parameter; and communicate the at least one control output to a communicably coupled actuation sub-system, the actuation sub-system operably coupled to at least one of: the inductive power transmission unit or the inductive power receiving unit.

Example 57 may include elements of example 56 where the machine-readable instructions that cause the inductive power transfer control circuit to receive a first signal that includes information indicative of at least one inductive energy transfer parameter, may further cause the inductive power transfer control circuit to: receive a first signal that includes information indicative of a power transfer rate between the inductive power transmission unit and the inductive power receiving unit.

Example 58 may include elements of example 56 where the machine-readable instructions may further cause the inductive power transfer control circuit to: receive a second signal that includes information indicative of a human presence proximate at least one of: the inductive power transmission unit or the inductive power receiving unit.

Example 59 may include elements of example 58 where the machine readable instructions may further cause the inductive power transfer control circuit to receive a third signal that includes information indicative of a magnetic field proximate at least one of: the inductive power transmission unit or the inductive power receiving unit.

Example 60 may include elements of example 59 where the machine-readable instructions that cause the inductive power transfer control circuit to generate the control output, may further cause the inductive power transfer control circuit to generate at least one control output that includes data indicative of a position in a three-dimensional (3D) space of at least one of: the inductive power transmission unit or the inductive power receiving unit such that the position limits the magnetic field proximate at least one of: the inductive power transmission unit or the inductive power receiving unit to a first threshold value responsive to a receipt of the second signal indicative of a human presence.

Example 61 may include elements of example 59 where the machine-readable instructions that cause the inductive power transfer control circuit to generate the control output, further cause the inductive power transfer control circuit to generate a control output that includes data indicative of a position in a three-dimensional (3D) space of at least one of:

the inductive power transmission unit; or, the inductive power receiving unit based on the at least one inductive energy transfer parameter responsive to a receipt of the second signal indicative of no human presence.

Example 62 may include elements of any of examples 56 through 61 where the machine-readable instructions that cause the inductive power transfer control circuit to generate the control output, further cause the inductive power transfer control circuit to generate a control output that includes data indicative of a position in a three-dimensional (3D) space of an inductive power receiving unit coupleable to a chassis of a motor vehicle with respect to an inductive power transmission unit disposed in a motor vehicle accessible surface.

Example 63 may include elements of example 62 where the machine-readable instructions that cause the inductive power transfer control circuit to generate the control output including data indicative of a position in a 3D space of an inductive power receiving unit coupleable to a chassis of a motor vehicle with respect to an inductive power transmission unit disposed in a motor vehicle accessible surface, further cause the inductive power transfer control circuit to generate at least one control output to control inductive power transfer from an inductive power transmission unit disposed in a roadway surface to the inductive power receiving unit as the motor vehicle travels along the roadway surface.

Example 64 may include elements of example 62 where the machine-readable instructions that cause the inductive power transfer control circuit to generate the control output including data indicative of a position in a 3D space of an inductive power receiving unit coupleable to a chassis of a motor vehicle with respect to an inductive power transmission unit disposed in a motor vehicle accessible surface, further cause the inductive power transfer control circuit to generate at least one control output to control inductive power transfer from an inductive power transmission unit disposed in a roadway surface to the inductive power receiving unit as the motor vehicle remains stationary with respect to the motor vehicle accessible surface.

Example 65 may include elements of example 62 where the machine-readable instructions that cause the inductive power transfer control circuit to generate the control output including data indicative of a position in a 3D space of an inductive power receiving unit coupleable to a chassis of a motor vehicle with respect to an inductive power transmission unit disposed in a motor vehicle accessible surface, further cause the inductive power transfer control circuit to generate a chassis height signal output to an adjustable motor vehicle chassis adjustable in at least one dimension, the chassis height signal output to optimize the at least one inductive energy transfer parameter.

Example 66 may include elements of example 62 where the machine-readable instructions further cause the inductive power transfer control circuit to receive a signal that includes information indicative of a physical position of the motor vehicle with respect to the roadway surface; and generate a feedback output signal that includes information representative of human perceptible instructions to achieve a motor vehicle position correction with respect to the roadway surface.

Example 67 may include elements of example 63 where the machine-readable instructions further cause the inductive power transfer control circuit to: receive a signal that includes information indicative of a physical position of the motor vehicle with respect to the roadway surface; and generate a feedback output signal to autonomously communicate a feedback output to the motor vehicle the feedback output including information to autonomously position the motor vehicle with respect to the roadway surface.

Example 68 may include elements of any of examples 56 through 61 where the machine-readable instructions that cause the inductive power transfer control circuit to generate the control output, further cause the inductive power transfer control circuit to generate a control output that includes data indicative of a position in a three-dimensional (3D) space of an inductive power transmission unit disposed in a motor vehicle accessible surface with respect to an inductive power receiver unit coupleable to a chassis of a motor vehicle.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A vehicle, comprising:
   a power receiving unit that includes at least one power receiving coil displaceably coupled to the vehicle; an adjustable height chassis
   an actuation sub-system operably coupled to the power receiving unit, the actuation sub-system to adjust a location of the inductive power receiving unit with respect to a power transmission unit embedded in a surface of a roadway as the vehicle travels along the roadway in a three dimensional (3D) space;
   at least one occupancy sensor to provide a signal that includes data indicative of a human presence inside the vehicle;
   at least one electromagnetic field sensor to provide at least one signal that includes data indicative of an electromagnetic parameter that includes at least one of: an electric field within at least a portion of the vehicle or a magnetic field within at least a portion of the vehicle;
   at least one position sensor to provide at least one signal that includes data indicative of a position of the power receiving unit with respect to the power transmission unit;
   control circuitry communicably coupled to the actuation sub-system;
   a storage device containing machine-readable instructions communicably coupled to the control circuitry, the machine-readable instructions, when executed by the control circuitry, transform at least a portion of the control circuitry to a dedicated power transfer control circuit, the power transfer control circuit to:
   detect a human presence in the vehicle;
   responsive to the detection of a human presence in the vehicle, cause the adjustable height chassis to adjust at least a vertical dimension and the actuation sub-system to adjust the power receiving unit in a location in 3D space as the vehicle travels along the roadway such that: power transfer between the power transmission unit and the power receiving unit is maximized and the power transfer control circuit maintains the measured electromagnetic parameter at or below a defined human exposure threshold value.

2. The vehicle of claim 1:
   wherein the power transmission unit further comprises a first transceiver;

wherein the power receiving unit further comprises a second transceiver, the second transceiver communicably coupled to the first transceiver; and wherein the first transceiver and the second transceiver bidirectionally exchange information representative of the inductive energy transfer between the power transmission unit and the power receiving unit.

3. The vehicle of claim 1, further comprising:
at least one inductive energy transfer sensor to provide at least one signal that includes information indicative of at least one inductive energy transfer parameter between the power transmission unit and the power receiving unit.

4. The vehicle of claim 1 wherein the power receiving unit is conductively coupled to an energy storage device conductively coupled to an electric motor.

5. The vehicle of claim 1 wherein the at least one sensor generates an output signal that includes data representative of a magnetic field proximate the power receiving unit.

6. The vehicle of claim 1 wherein the at least one sensor provides an output signal that includes data representative of a power transfer rate between the power transmission unit and the power receiving unit.

7. The vehicle of claim 6, further comprising:
a vehicle operator feedback sub-system that includes:
a human perceptible output device; and
feedback control circuitry communicably coupled to the power transfer control circuit, the feedback control circuitry to:
receive a feedback signal from the power transfer control circuit, the feedback signal including information indicative of at least one vehicle position correction to adjust the position of the vehicle with respect to the power transmission unit based on the at least one inductive energy transfer parameter; and
generate a feedback output that includes human perceptible instructions on a control input to achieve the adjusted vehicle position.

8. The vehicle of claim 6, further comprising
an autonomous vehicle feedback sub-system that includes:
feedback control circuitry communicably coupled to the power transfer control circuit and at least one vehicular directional control sub-system, the feedback control circuitry to:
receive a feedback signal from the power transfer control circuit, the feedback signal including information indicative of at least one vehicle position correction to adjust the position of the vehicle with respect to the power transmission unit based on the at least one inductive energy transfer parameter;
generate a vehicle positional control output to achieve the adjusted vehicle position; and
communicate the vehicle positional control output to the at least one vehicular directional control sub-system.

9. A computer-implemented inductive power transfer method, comprising:
receiving, by a power transfer control circuit disposed in a vehicle:
a first signal that includes data indicative of a human presence inside the vehicle;
a second signal that includes data indicative of an electromagnetic parameter that includes at least one of: an electric field within at least a portion of the vehicle or a magnetic field within at least a portion of the vehicle; and
a third signal that includes data indicative of a position of a power receiving unit displaceably coupled to the vehicle with respect to a power transmission unit embedded in a surface of a roadway as the vehicle travels along the roadway in a three dimensional (3D) space;
detecting, by the power transfer control circuit, a human presence in the vehicle;
generating, by the power transfer control circuit, at least one control output, the control output to cause an adjustable height chassis to adjust at least a vertical height of the vehicle and an actuation sub-system coupled to the vehicle to maintain the power receiving unit in a location in 3D space as the vehicle travels along the roadway such that: power transfer between the power transmission unit and the power receiving unit is maximized and the power transfer control circuit maintains the measured electromagnetic parameter at or below a defined human exposure threshold value, responsive to the detection of a human presence in the vehicle; and
communicating the at least one control output to the actuation sub-system.

10. The computer-implemented method of claim 9 wherein receiving a first signal that includes information indicative of at least one inductive energy transfer parameter comprises:
receiving, at the power transfer control circuit, a first signal that includes information indicative of a power transfer rate between the inductive power transmission unit and the inductive power receiving unit.

11. The computer-implemented method of claim 9 wherein generating the at least one control output further comprises:
generating, by the power transfer control circuit, a control output to cause the actuation sub-system to maintain the power receiving unit in a location in 3D space as the vehicle travels along the roadway such that: power transfer between the power transmission unit and the power receiving unit is maximized, responsive to an absence of human presence in the vehicle.

12. The computer-implemented method of claim 9, further comprising:
receiving, at the power transfer control circuit, a signal that includes information indicative of a physical position of the vehicle with respect to the roadway; and
generating, by the power transfer control circuit, a feedback output signal that includes information representative of human perceptible instructions to adjust a position of the vehicle with respect to the roadway.

13. The computer-implemented method of claim 9, further comprising:
receiving, by the power transfer control circuit, a signal that includes information indicative of a physical position of the vehicle with respect to the roadway surface; and
generating, by the power transfer control circuit, a feedback output signal to autonomously communicate a feedback output to the motor vehicle the feedback output including information to autonomously adjust a position of the vehicle with respect to the roadway.

14. A storage device that includes machine-readable instructions that when executed by controller circuitry transform the controller circuitry to an power transfer control circuit disposed in a vehicle, the power transfer control circuit to:
- receive a first signal that includes data indicative of a human presence inside the vehicle;
- receive a second signal that includes data indicative of an electromagnetic parameter that includes at least one of: an electric field within at least a portion of the vehicle or a magnetic field within at least a portion of the vehicle; and
- receive a third signal that includes data indicative of a position of a power receiving unit displaceably coupled to the vehicle with respect to a power transmission unit embedded in a surface of a roadway as the vehicle travels along the roadway in a three dimensional (3D) space;
- generate at least one control output, the control output to cause an adjustable height chassis to adjust at least a vertical of the vehicle and an actuation sub-system coupled to the vehicle to maintain the power receiving unit in a location in 3D space as the vehicle travels along the roadway such that: power transfer between the power transmission unit and the power receiving unit is maximized and the power transfer control circuit maintains the measured electromagnetic parameter at or below a defined human exposure threshold value, responsive to the detection of a human presence in the vehicle; and
- communicate the at least one control output to a communicably coupled actuation sub-system coupled to the vehicle.

* * * * *